(12) United States Patent
Jaeckel

(10) Patent No.: US 11,021,093 B2
(45) Date of Patent: **\*Jun. 1, 2021**

(54) FOOD AND DRINK HOLDER

(71) Applicant: David Jaeckel, South Bend, IN (US)

(72) Inventor: David Jaeckel, South Bend, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/673,480

(22) Filed: Nov. 4, 2019

(65) Prior Publication Data

US 2020/0062161 A1 Feb. 27, 2020

Related U.S. Application Data

(63) Continuation of application No. 15/986,106, filed on May 22, 2018, now Pat. No. 10,463,156.

(60) Provisional application No. 62/562,607, filed on Sep. 25, 2017, provisional application No. 62/509,288, filed on May 22, 2017.

(51) Int. Cl.
*A47C 7/62* (2006.01)
*A47C 7/68* (2006.01)
*B60N 3/10* (2006.01)

(52) U.S. Cl.
CPC .............. *B60N 3/107* (2013.01); *B60N 3/103* (2013.01)

(58) Field of Classification Search
CPC ............ A47C 7/70; A47C 7/624; A47C 7/622
USPC ............... 297/188.14, 188.18, 188.2, 188.06
See application file for complete search history.

(56) References Cited

U.S. PATENT DOCUMENTS

| | | | | | |
|---|---|---|---|---|---|
| 2,672,182 | A | * | 3/1954 | Gwin | A47D 15/00 297/188.2 X |
| 3,675,969 | A | * | 7/1972 | Gage | A47C 7/62 297/188.18 |
| 4,293,971 | A | * | 10/1981 | Block | A47L 11/30 15/320 |
| 4,560,128 | A | * | 12/1985 | Willeby | A47C 7/62 297/188.2 X |
| 4,613,048 | A | * | 9/1986 | McGill | B60N 3/101 297/188.18 X |
| 4,795,211 | A | * | 1/1989 | Stern | A47C 7/624 297/188.18 |
| 4,798,413 | A | * | 1/1989 | Capelli | A47C 7/624 297/188.18 X |
| 4,861,102 | A | * | 8/1989 | Fuller | A47C 7/68 297/188.2 X |
| 4,863,134 | A | * | 9/1989 | Young | A47C 7/68 297/188.18 X |
| 5,118,063 | A | * | 6/1992 | Young, Sr. | A47G 23/06 297/188.18 X |
| 5,234,251 | A | * | 8/1993 | Ayotte | A47C 7/624 297/188.14 |
| 5,503,297 | A | * | 4/1996 | Frankel | A47G 23/0225 248/311.2 X |

(Continued)

*Primary Examiner* — Rodney B White
(74) *Attorney, Agent, or Firm* — Krieg DeVault LLP; Daniel Tychonievich

(57) ABSTRACT

In one embodiment of the invention, a food and drink holder configured to be removably mounted to a cup holder attached to seats or an arm rest is provided that includes a drink receptacle. The drink receptacle includes a generally cylindrical sidewall having a central axis, and the sidewall is configured to be removably mounted in an opening in the cup holder. The food and drink holder also includes a food receptacle having a pair of sidewalls, a front wall, an end wall, a bottom wall, and a top end.

20 Claims, 33 Drawing Sheets

(56) References Cited

U.S. PATENT DOCUMENTS

| | | | | |
|---|---|---|---|---|
| 5,533,782 A * | 7/1996 | Goldman | A47C 7/62 | 297/188.18 |
| 5,720,516 A * | 2/1998 | Young | A47G 23/0225 | 297/188.18 |
| 5,865,412 A * | 2/1999 | Mason | A47C 7/624 | 297/188.18 X |
| 6,045,173 A * | 4/2000 | Tiesler | B60N 3/102 | 297/188.14 X |
| 6,062,640 A * | 5/2000 | Stahl | A47C 7/70 | 297/188.18 X |
| 7,290,746 B1 * | 11/2007 | Macias | A47C 7/705 | 297/188.18 X |
| 7,585,021 B2 * | 9/2009 | Tabata | B29C 44/1257 | 297/188.14 |
| 8,550,550 B2 * | 10/2013 | Cassese | B65D 15/00 | 297/188.18 |
| 8,662,581 B1 * | 3/2014 | Behbehani | B60N 3/12 | 297/188.18 |
| 8,777,307 B2 * | 7/2014 | Nelson | A47C 7/70 | 297/188.18 |
| 8,864,225 B2 * | 10/2014 | Nagasawa | B60R 7/043 | 297/188.2 X |
| 8,915,412 B2 * | 12/2014 | Abro | B60N 3/101 | 297/188.14 X |
| 8,944,499 B2 * | 2/2015 | Oh | B60N 3/104 | 297/180.14 |
| 10,463,156 B2 * | 11/2019 | Jaeckel | A47C 7/622 | |
| 2006/0118688 A1 * | 6/2006 | Kong | B60N 3/108 | 248/311.2 |
| 2006/0170257 A1 * | 8/2006 | Marshall | A47C 7/68 | 297/188.14 |
| 2008/0208694 A1 * | 8/2008 | Baggott | A47C 1/121 | 297/146 X |
| 2009/0021058 A1 * | 1/2009 | Rajack | A47C 7/624 | 297/188.18 |
| 2011/0025105 A1 * | 2/2011 | Henke | B60N 3/108 | 297/188.14 |
| 2012/0007394 A1 * | 1/2012 | Nelson | A47C 7/624 | 297/188.18 |
| 2016/0121768 A1 * | 5/2016 | Terranova | B60N 2/787 | 297/188.14 |
| 2017/0318974 A1 * | 11/2017 | Bergin | A47C 1/12 | |
| 2019/0014935 A1 * | 1/2019 | Bergin | A47G 23/0225 | |
| 2019/0159600 A1 * | 5/2019 | Sartor | A47C 1/124 | |

\* cited by examiner

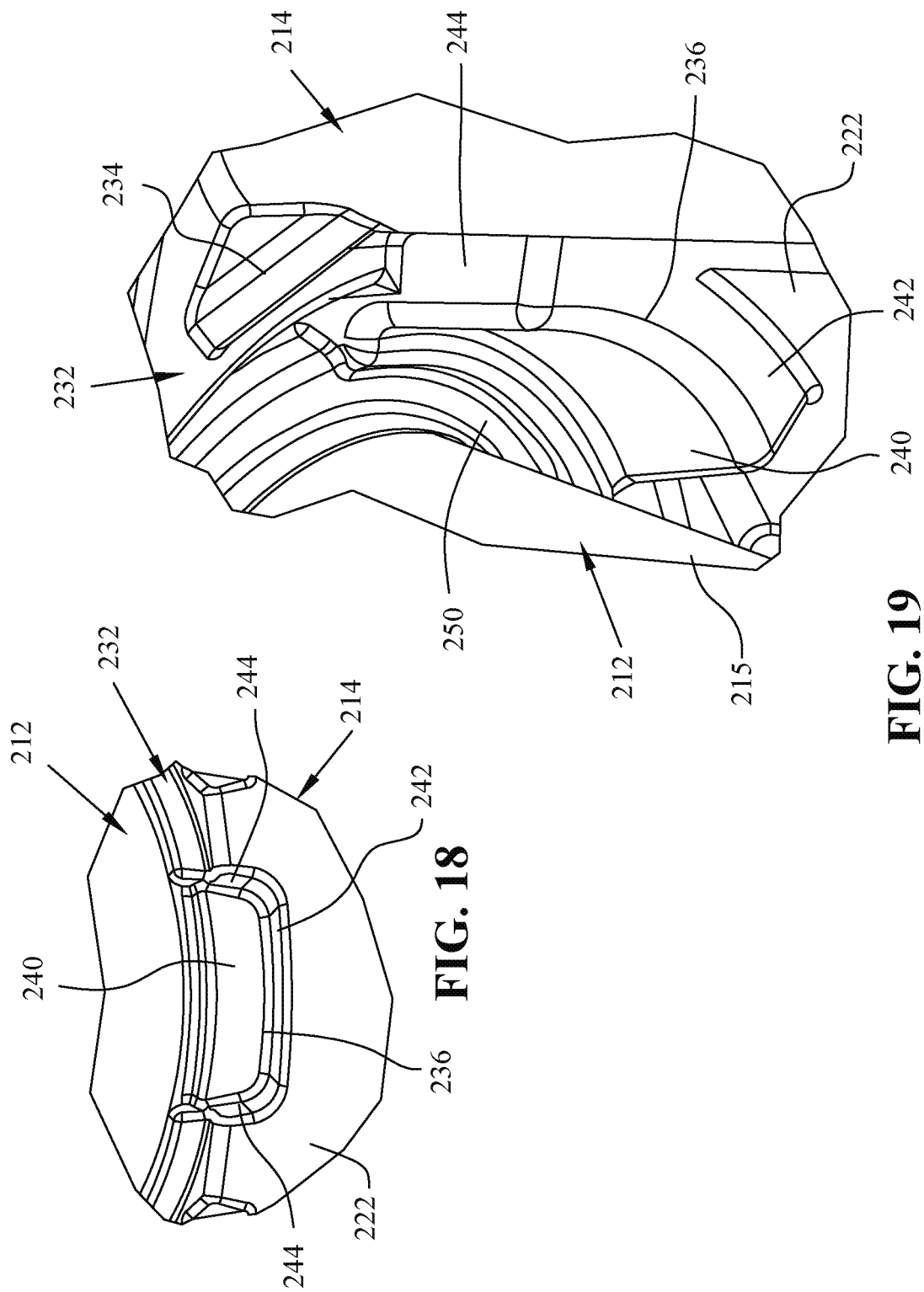

FOOD AND DRINK HOLDER

CROSS-REFERENCE TO RELATED APPLICATION

This non-provisional continuation-in-part utility application claims priority to non-provisional U.S. utility patent application Ser. No. 15/986,106 filed on May 22, 2018, now U.S. Pat. No. 10,463,156 B2, and U.S. Provisional Patent Applications Ser. No. 62/562,607 filed on Sep. 25, 2017 and 62/509,288 filed on May 22, 2017, the complete disclosures of which are incorporated in their entireties herein as if fully rewritten.

BACKGROUND OF THE INVENTION

The subject invention relates to a food and drink holder, and in particular, to a food and drink holder configured to mount in drink holders attached to seats or armrests at a public venue including but not limited to sporting arenas and stadiums, movie theatres, performance theatres and auditoriums.

Most public venues have concession stands where patrons may purchase food and drink to take back to their seats to consume while watching an event. It is difficult to hold a drink and food items while sitting at such an event as there is no table provided at most seats, and patrons often need their hands free to clap or read programs. Many concession stands offer disposable paperboard trays that may contain one or more cup holding compartments/areas and an open tray to place food items in. However, as most seats don't have tables, such a paperboard tray must be balanced on a user's lap. These paperboard trays are not very sturdy and activity such as moving or clapping can cause a cup to tip out of the holder or for the tray to fall off the user's lap. Condiments may also end up soiling the user's clothing.

To help alleviate this problem with current trays, many venues have added rigid cup holders to the seats or arm rests. Commonly, such rigid cup holders are located in the back of the row of seats in front and generally between the seats as the backs of the seats generally do not extend backward as far at the side ends. Alternately, cup holders have been added at forward ends of the seat armrests. While these cup holders have proven very beneficial for holding drinks at such venues as discussed above, they still do not help with the paperboard trays for food that must be help by hand of the users or balanced on the laps thereof.

In an attempt to address the above noted shortcomings of holding drinks and food at public venues combined beverage and food trays have been developed that are designed to mount in cup holders at public venues. One such unit is a beverage and container holder disclosed in U.S. Pat. No. 7,290,746 B1 to Macias et al., which is incorporated in its entirety herein by reference. Macias et al. discloses an assembly having a beverage holder compartment and provides one or more surfaces for food and beverage placement, writing etc. It is adapted for use in theaters, stadiums, convention halls and home entertainment centers. The assembly is removably supported in the seat arm beverage/cup holder. The position is adjustable. The tray in Macias et al. is not suitable; however for beverage holders mounted to the backs of the seats in the forward row. It would also be cost prohibitive as a disposable item at concession stands.

Also, US Patent Application Publication 2017/0318974 A1 to Bergin discloses a portable customizable swiveling concession tray, which is incorporated in its entirety herein by reference. The tray in Bergin is removably securable to a pre-existing container holder such that the tray and container holder can swivel about the connection of the tray to the seat. The connection includes a customizable insert which can be of different heights depending upon the pre-existing holder. It is particularly designed for mounting to a holder in an armrest and would not be suitable for mounting to a holder in the back of the forward row of seats. The tray and connecting insert disclosed in Bergin would also be cost prohibitive as a disposable item for concession stands.

It is an object of the invention to provide a food and drink holder that overcomes the shortcomings of the prior art and is removably mountable to a rigid beverage container holder attached to seat backs or armrests at a public venue.

SUMMARY OF THE INVENTION

In one embodiment of the invention, a food and drink holder configured to be removably mounted to a cup holder attached to seats or an arm rest is provided that includes a drink receptacle. The drink receptacle includes a generally cylindrical sidewall having a central axis, and the sidewall is configured to be removably mounted in an opening in the cup holder. The food and drink holder also includes a food receptacle having a pair of sidewalls, a front wall, an end wall, a bottom wall, and a top end. The top end of the food receptacle extends at an angle less than 90° to the central axis of the sidewall of the drink receptacle.

The drink receptacle of the food and drink holder may have an open bottom and at least one tab extending from the sidewall of the drink receptacle. The at least one tab can engage the cup holder to removably secure the food and drink holder thereto.

The food and drink holder may further include a flange extending at least partially around an upper end of the food and drink holder. The flange may extend completely around the food and drink holder, and the flange around the food receptacle can be at an angle to the flange around the drink receptacle. The flange may extend around the sidewalls and end wall of the food receptacle and transitions to flare up on at least a portion of the drink receptacle.

The food and drink holder may have a drink receptacle with a bottom wall and apertures in at least one of the sidewall or bottom wall of the drink receptacle.

The food and drink holder may further include a brace. The brace may engage the cup holder to removably secure the food and drink holder thereto.

The food and drink holder may further include at least one indentation in at least one of the sidewall or bottom wall of the drink receptacle and at least one indentation in at least one of the bottom wall or sidewalls of the food receptacle.

In another aspect of the invention, a food and drink holder is provided that is configured to be removably mounted to a cup holder attached to seats or an arm rest. The food and drink holder may include a drink receptacle wherein the drink receptacle includes a generally cylindrical sidewall configured to be removably mounted in an opening in the cup holder. The food and drink holder may also include a food receptacle having a pair of sidewalls, a front wall, an end wall, a bottom wall, and a top end. The food and drink holder may also include a brace configured to engage the cup holder to removably secure the food and drink holder thereto.

The brace of the food and drink holder may be formed in the front wall of the food receptacle. The brace may have a front wall, a bottom ledge, and two side ledges. The front wall of the brace may be configured to engage the cup holder.

The drink receptacle of the food and drink holder may have a central axis in the sidewall thereof, and the top end of the food receptacle may extend at an angle, less than 90°, to the central axis of the sidewall of the drink receptacle.

The drink receptacle may have a bottom wall and apertures in at least one of the sidewall or bottom wall. The drink receptacle may have at least one indentation in at least one of the sidewall or bottom wall. The food receptacle may also have at least one indentation in the sidewall or bottom wall thereof. The at least one indentation in the drink receptacle may have a generally L-shaped configuration. The food and drink holders may be configured to be stacked together, and the orientation or position of the indentations in the drink receptacle or the food receptacle are varied for subsequently stacked food and drink holders.

In yet another aspect of the invention, a food and drink holder is provided that is configured to be removably mounted to a cup holder attached to seats or an arm rest that includes a drink receptacle wherein the drink receptacle includes a generally cylindrical sidewall. The sidewall may be configured to be removably mounted in an opening of the cup holder. The food and drink holder may also include a food receptacle having a pair of sidewalls, a front wall, an end wall, a bottom wall, and a top end. The food and drink holder may also be provided with a flange extending around the sidewalls and end wall at the top end of the food receptacle and transitioning to flare up at least a portion of the sidewall of the drink receptacle.

The food and drink holder may include indentations in the sidewall of the drink receptacle and indentations in at least the sidewalls or bottom wall of the food receptacle. The indentations in the drink receptacle may have a generally L-shaped configuration, and the food and drink holder may be configured to be stackable with one another. The orientation of the bottom of the L-shaped indentations may be varied on subsequent stacked food and drink holders. The location of the indentations in the food receptacle may be varied on subsequent stacked food and drink holders.

BRIEF DESCRIPTION OF THE DRAWINGS

The above mentioned and other features and objects of this invention and the manner of obtaining them will become more apparent and the invention itself will be better understood by reference to the following description of embodiments of the present invention taken in conjunction with the accompanying drawings. The accompanying drawings illustrate only possible embodiments of the systems, devices and methods and are therefore not to be considered limiting in scope. The components in the figures are not necessarily to scale, and simply illustrate the principles of the devices and methods.

FIG. 18 is an enlarged view of the brace of the food and drink holder of FIG. 14, viewed from the food receptacle section;

FIG. 19 is an enlarged side perspective view of the brace of the food and drink holder of FIG. 14;

DETAILED DESCRIPTION OF EMBODIMENTS OF THE INVENTION

Figure 1:
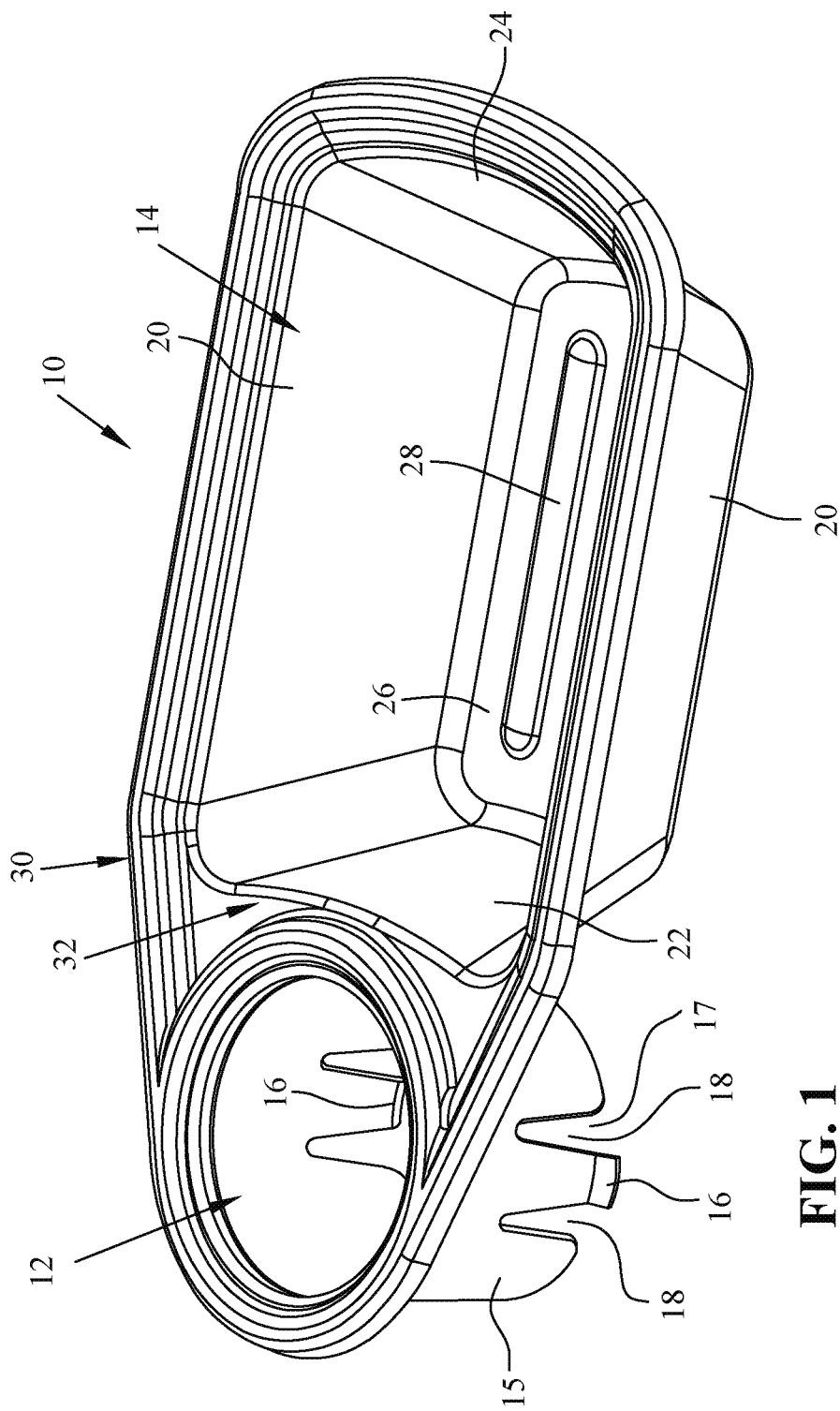
FIG. 1 is a perspective of one embodiment of a food and drink holder with a drink receptacle and a food receptacle in accordance with the invention.

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

The food and drink holders described in this application are portable dual-purpose drink and food holders that clip into or attaches to a traditional cup holder mounted to a seat or arm rest in a public venue to enhance the utility of the cup holder, rendering it capable of supporting food as well as drink. While the food and drink holders can be used in a variety of settings, it is particularly useful at stadiums, arenas, and movie theaters. Besides making the cup holder dual purpose, the food and drink holder creates more space for the patron's legs, leads to fewer accidents from either the patron's legs or other event-goer's legs, frees the patron's hands for other purposes, and creates an overall better eating experience.

Figure 3:
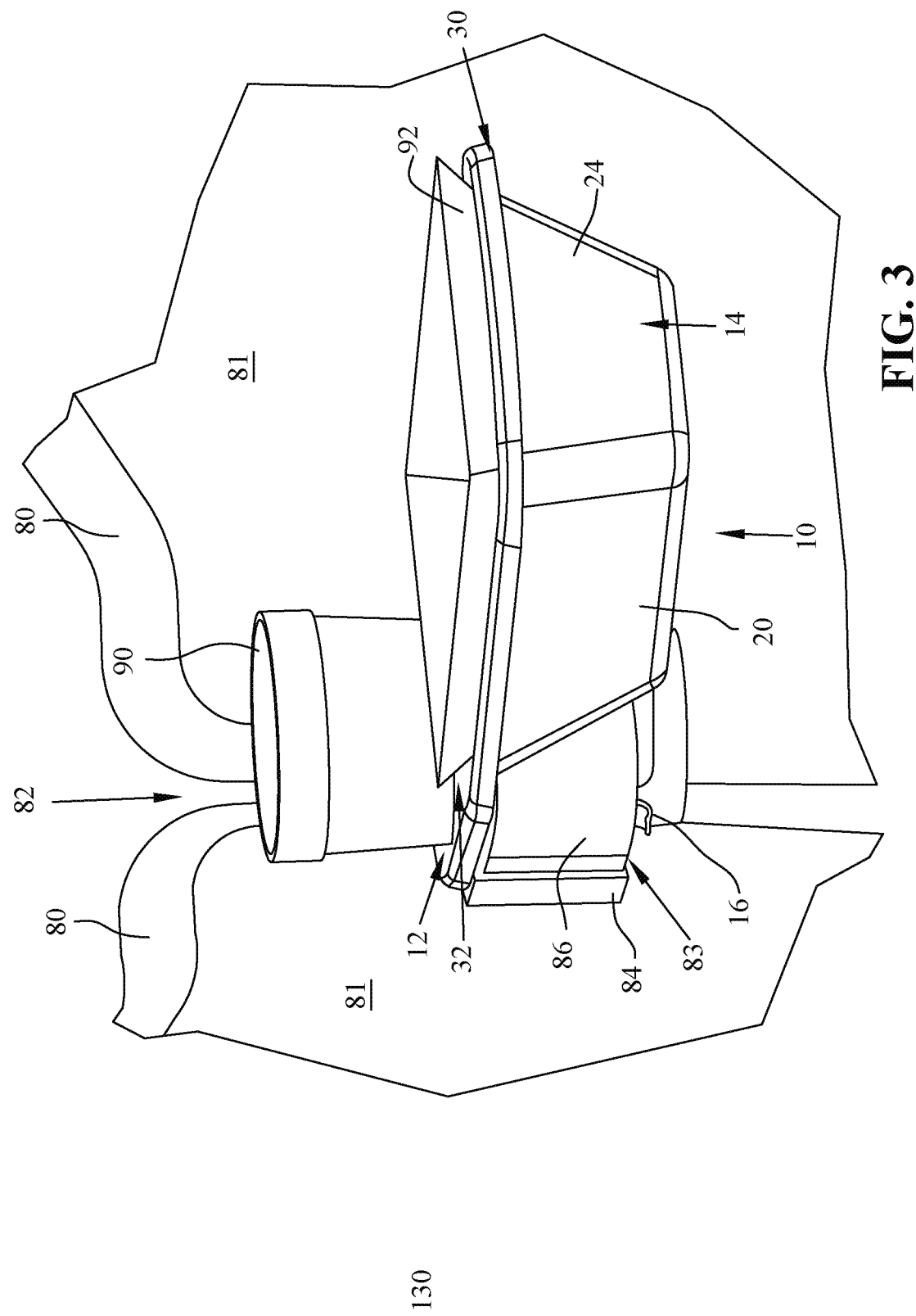
FIG. 3 is an enlarged perspective view of the food and drink holder of FIG. 1 inserted into holder attached to the forward row of seats while holding the cup and concession serving dish.
Figure 4:
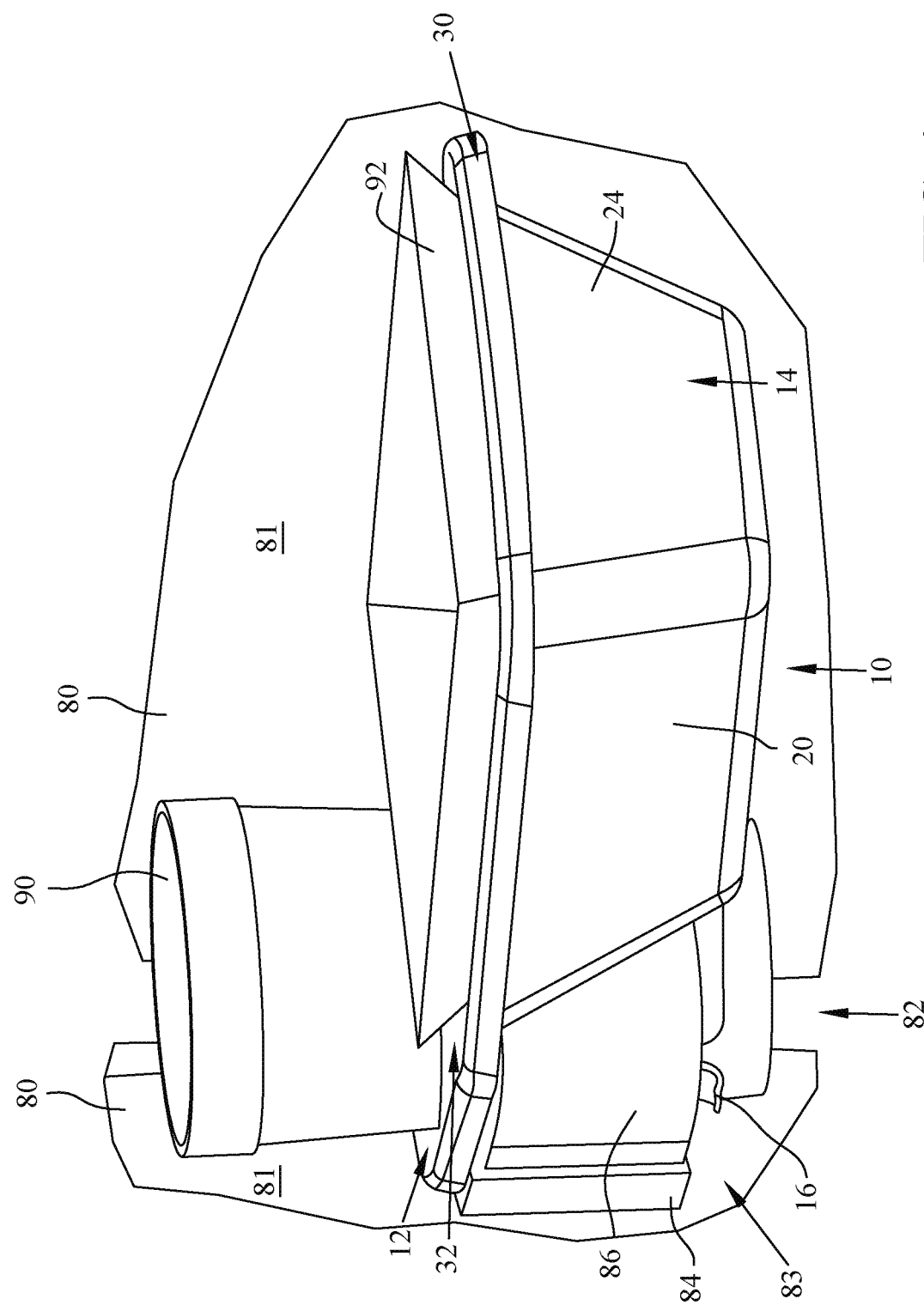
FIG. 4 is another perspective view of the food and drink holder of FIG. 1 inserted into holder attached to the forward row of seats while holding the cup and concession serving dish and showing a tab, which along with a tab on the other side of the food and drink holder, secures the food and drink holder to the cup holder allowing rotation of the food and drink holder.
Figure 5:
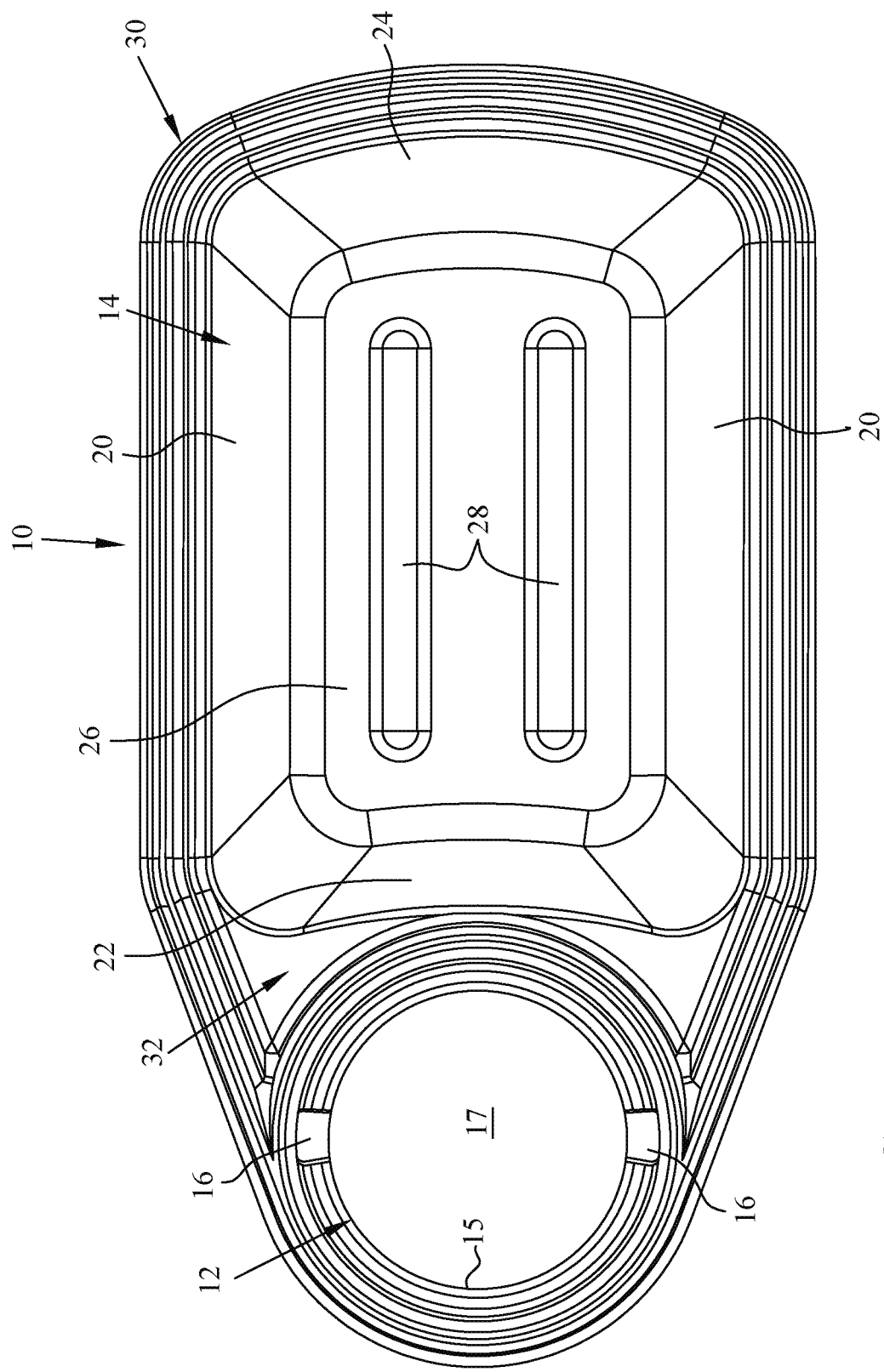
FIG. 5 is a bottom plan view of the food and drink holder of FIG. 1 and the two tabs located about 180 degrees apart on the circumference of the drink receptacle.
Figure 6:
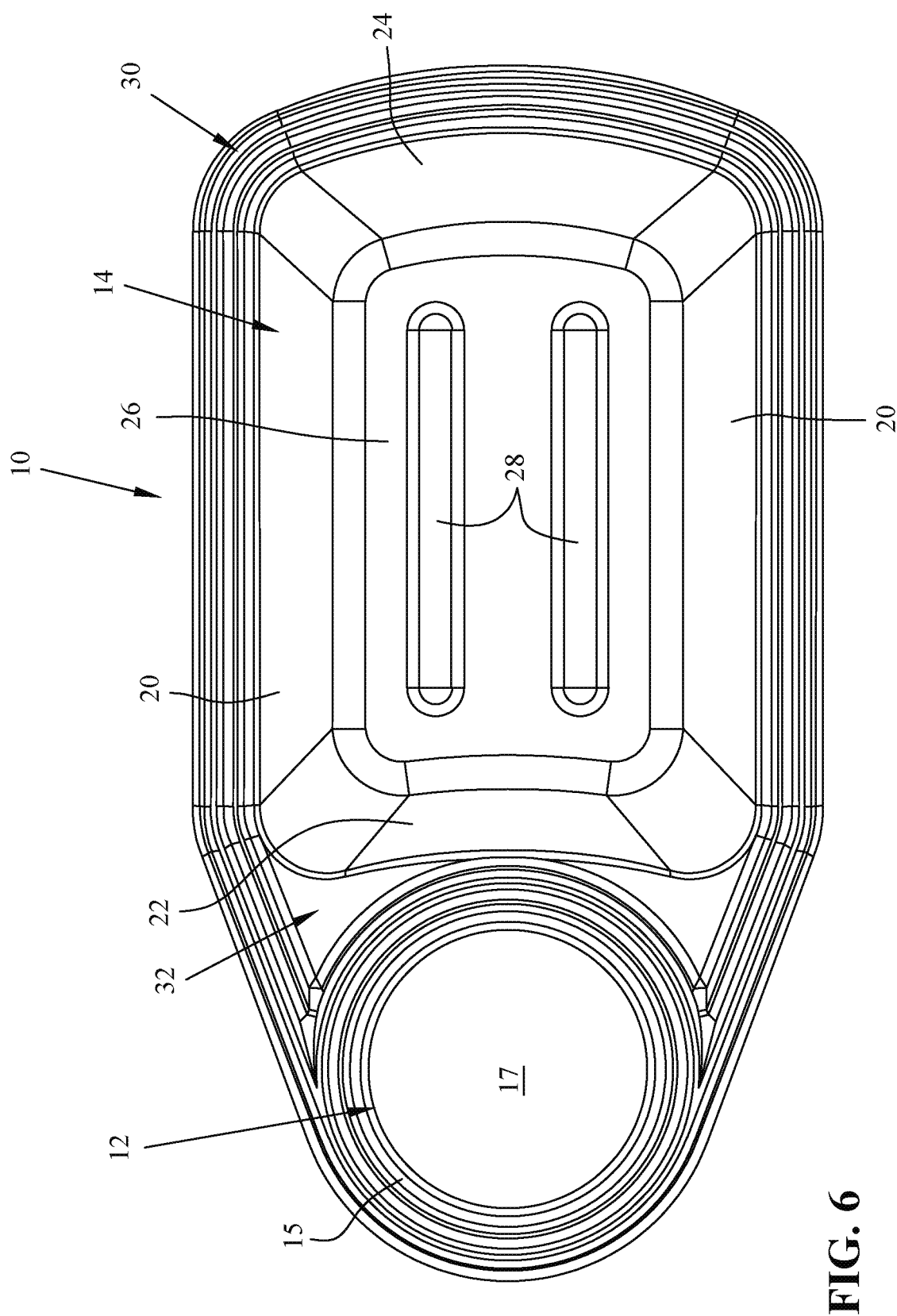
FIG. 6 is a top plan view of the food and drink holder of FIG. 1 showing the shape and structure of the supports connecting the two receptacle sections in an embodiment of the food and drink holder.

Referring now to FIGS. 1-10, one embodiment of a food and drink holder in accordance with the subject invention is generally indicated as 10. Food and drink holder 10 includes a generally cylindrical drink receptacle, which is generally indicated as 12, and a generally rectangular food receptacle, which is generally indicated as 14. Drink receptacle 12 has a generally cylindrical sidewall 15 having tabs 16 extending therefrom. Drink receptacle 12 is shown with an open bottom 17, and slots 18 that separate the tabs 16 form sidewall 15. Sidewall 15 has a central axis extending there through. Referring to FIGS. 5 and 6, the central axis is in the center of sidewall 15 extending into and perpendicular to the plane of the paper.

Food receptacle 14 includes sidewalls 20, a front wall 22, an end or rear wall 24, and a generally solid bottom wall 26. In other embodiments, the bottom of the drink receptacle can be closed or partially closed. Bottom wall 26 includes reinforcing or stiffening ribs 28. A collar, flange or lip, which is generally indicated as 30, is provided around the top circumference of food and drink holder 10. As should be appreciated flange 30 provides stiffness and rigidity to the food and drink holder to hold the weight of food items in food receptacle 14 without bending or collapsing. Flange 30/the top of food receptacle 14 extends approximately perpendicular to the central axis of sidewall 15 of the drink receptacle 12. A connecting portion, generally indicted as 32 connects drink receptacle 12 and food receptacle 14 into a single unitary configuration.

The food and drink holder and any of its component parts can be formed from a variety of materials, including but not limited to plant materials, food grade plastics, compostable materials, pressed molded fiber or pulp, disposable plastic, durable plastic, polystyrene, cardboard, wood, or mesh materials. For example, a recyclable version could be manufactured from molded fiber or recycled materials. This version could be disposable or single use. Other embodiments can be formed from polymers or plastics that allow the food and drink holder to be cleaned and reused. Embodiments can also be decorated with marks or designs specific to the events or preferences of the user (e.g., favorite sports team or advertising). In one version of the food and drink holder, the holder is manufactured from a mixture of sugar cane residue (called bagasse) and bamboo. Bagasse is a fibrous material that remains after sugarcane or sorghum stalks are crushed to extract their juice. It has been determined that a ratio of 70 percent bagasse and 30 percent bamboo can provide a material that is very suitable for molding an inexpensive tray that is rigid enough to hold food and drink cups, but which is also readily biodegradable. Alternately, a mixture of 70 percent eucalyptus plant and 30 percent bamboo has also been found to be suitable for the same reasons.

Figure 2:
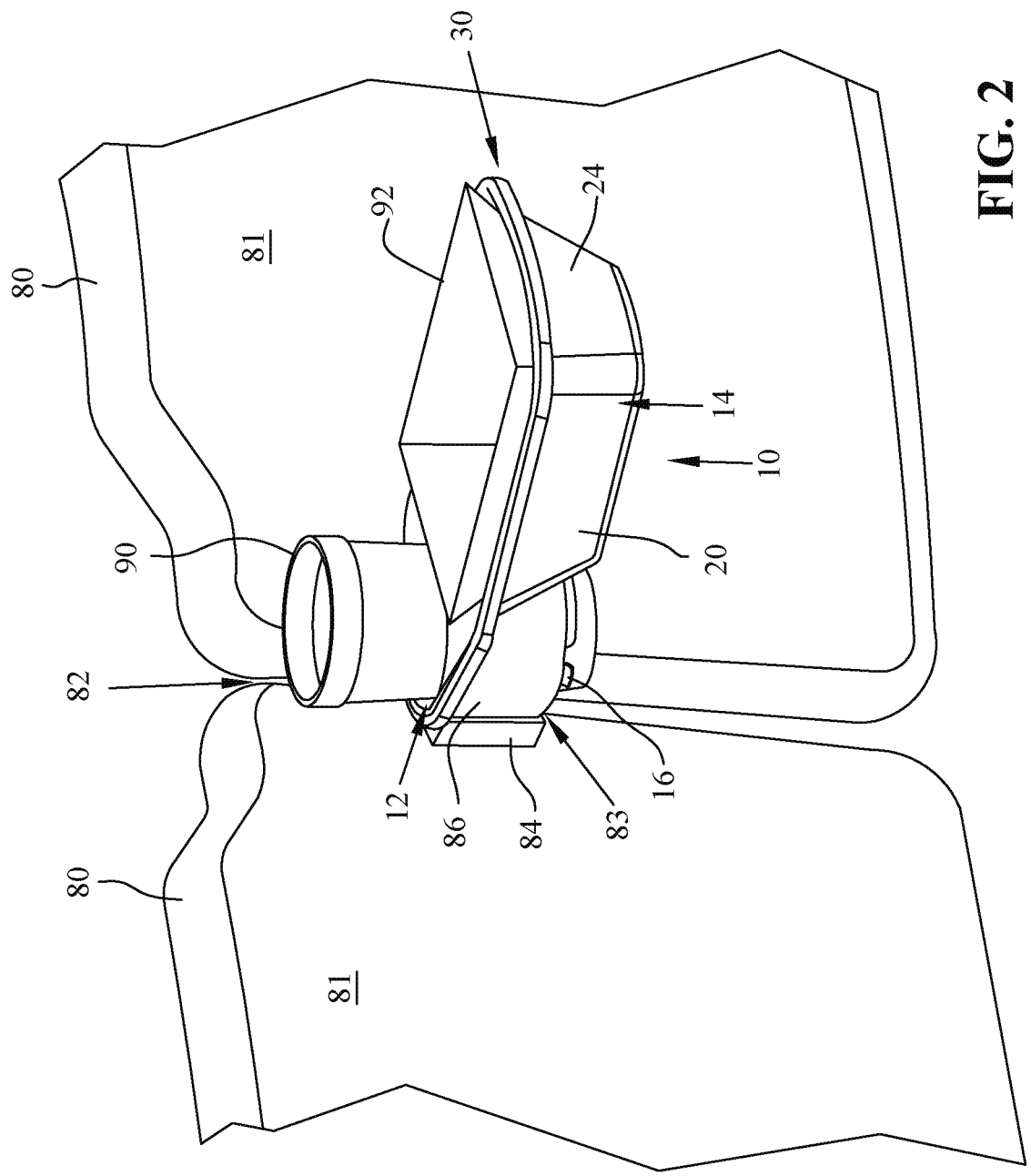
FIG. 2 is a perspective view of the food and drink holder of FIG. 1 inserted into a cup holder that is attached to a forward row of seats while holding a cup and a serving dish.

When in use, the drink receptacle 12 can be inserted into a cup holder or receptacle, generally indicated as 83, as seen in FIGS. 2-4. Here, the cup holder 83 is attached to the back 81 of a row of seats 80. This allows the individuals in the row behind the illustrated row 80 to set their drinks in the drink receptacle. Cup holder 83 is mounted in a region 82 between adjoining seats 80. As the backs 81 of seats 80 are generally curved and extend back farthest in a central portion thereof, and extend back less at the edges, region 82 allows more room for attendees to sit without their legs or knees bumping into cup holder 83. Cup holder 83 includes an attachment portion 84 and a circumferential sidewall 86. The drink receptacle 12 is sized and shaped to insert in the cup holder 83.

In embodiments, the drink receptacle 12 will support standard sized cups and can be sized and shaped for cups, bottles, cans, and the like. Other embodiments of the drink receptacle 12 will have varying diameters to hold various cup sizes, or different mechanisms to support cups, bottles, cans, and the like of various diameters.

Embodiments of the food and drink holder 10 are designed to hold a standard stadium cup 90 and a standard stadium concession serving dish 92, as shown in FIGS. 2-4. Alternatively, the food receptacle 14 can be filled with food (not shown) without the need for an additional serving dish 92 or other sized serving dishes can be used to hold the food.

The food and drink holder 10 includes a locking mechanism that helps ensure that the food and drink holder 10 remains securely engaged with the cup holder 83, even when the drink is removed from the drink receptacle 12. To offset the weight of food, the tabs 16 of drink receptacle 12 secure the food and drink holder 10 to the cup holder 83. See FIG. 4 for an illustration of this locking mechanism. As illustrated in FIGS. 2-4, the tabs extend from the bottom of the drink receptacle section 12 and engage the bottom of the cup holder 83, which in this embodiment has an open or openings in the bottom thereof. In embodiments, the drink receptacle includes two tabs 16, and the location of the two tabs is approximately 180 degrees apart on the circumference of the circle, as shown in FIG. 5.

When sliding this embodiment of the food and drink holder 10 into place, the user slightly compresses the one or more tabs 16, which slide down through the cup holder 83. In other embodiments, the walls 86 of the cup holder 83 compress the one or more tabs 16 as the drink receptacle 12 is slid into position in the cup holder 83. After passing through the cup holder 83, the one or more tabs 16 expand, locking the food and drink holder 10 into place. The one or more tabs 16 allow the drink receptacle section 12 to rotate in the cup holder 83 so that the food receptacle 14 pivots around the cup holder 83. This provides the flexibility to move the food and drink holder 10 when other event-goers pass by the user's seat and gives the user the flexibility to move the food and drink holder 10 to the user's preferred eating position.

To release the food and drink holder 10, the user slightly compresses the one or more tabs 16, which slide up through the cup holder 83. Once released, the food and drink holder 10 could be used again in another location or could be recycled. In other embodiments, the number and location of the one or more tabs 16 may change. For example, in another embodiment, a single tab 16 opposite the food receptacle is sufficient to prevent excess weight in the food receptacle from over-balancing the food and drink holder 10. Further, in another embodiment, the tab 16 could be replaced with another mechanism that exerts pressure on the cup holder 83 to secure the food and drink holder. For example, the food and drink holder 10 could be secured by a latch, fastener, or hinge.

As best illustrated in FIG. 6, the drink receptacle 12 and the food receptacle 14 are connected near the top of each with connecting portion 32. This connecting portion 32 near the top of the food receptacle 14 and the drink receptacle 12 allows the drink receptacle 12 to be inserted deeply in the cup holder 83, which enhances the stability of the food and drink holder 10.

Figure 7:
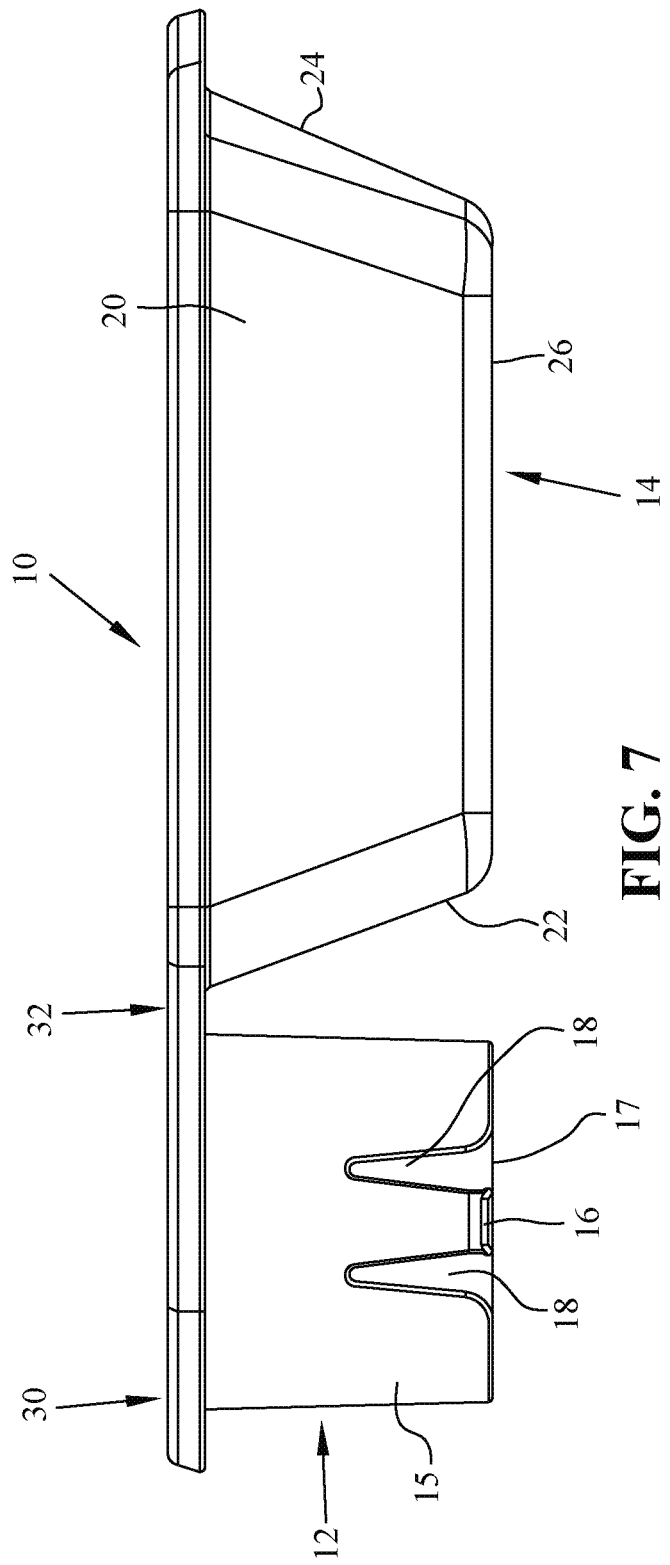
FIG. 7 is a side view of the food and drink holder of FIG. 1.
Figure 8:
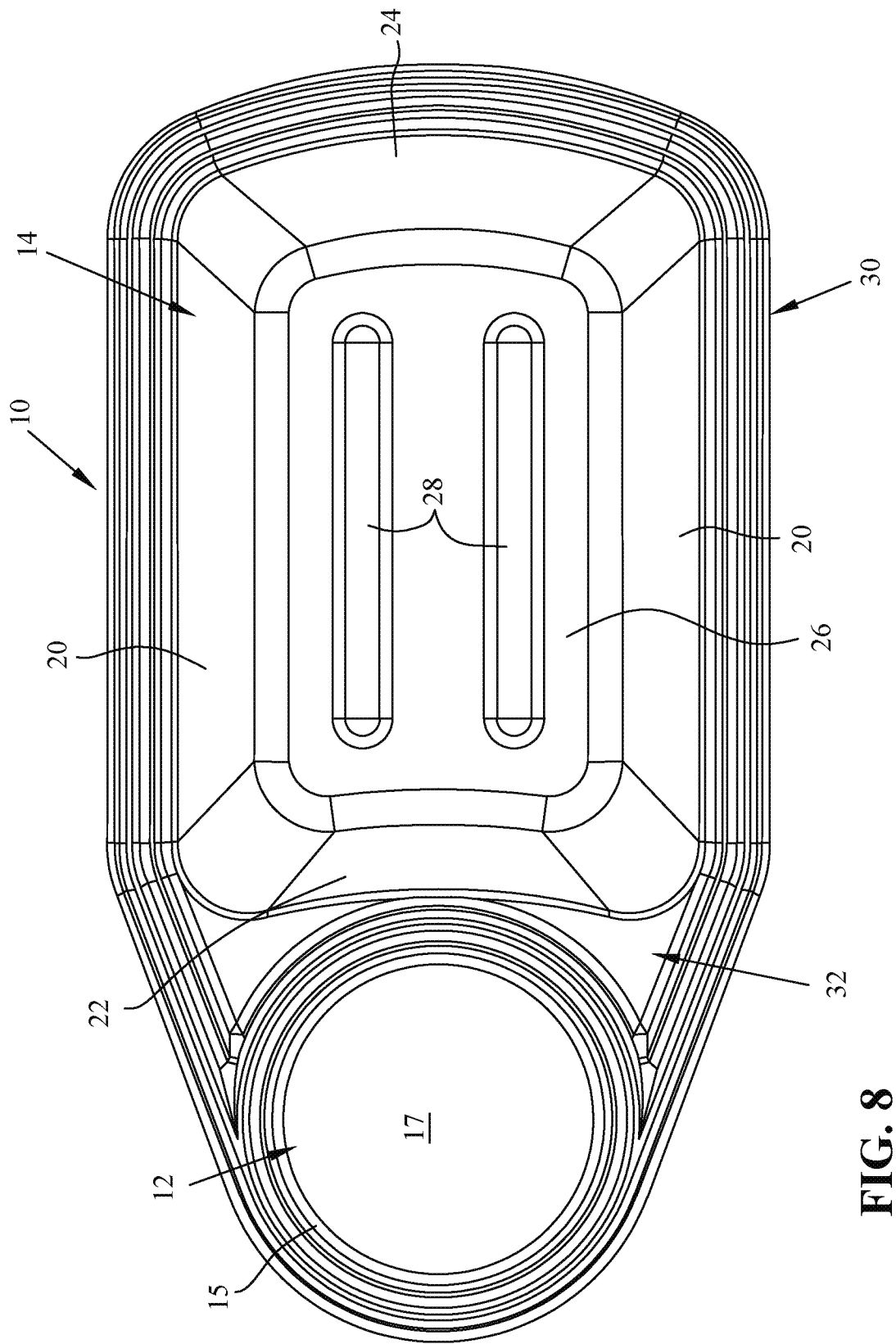
FIG. 8 is another plan view of the food and drink holder of FIG. 1.
Figure 9:
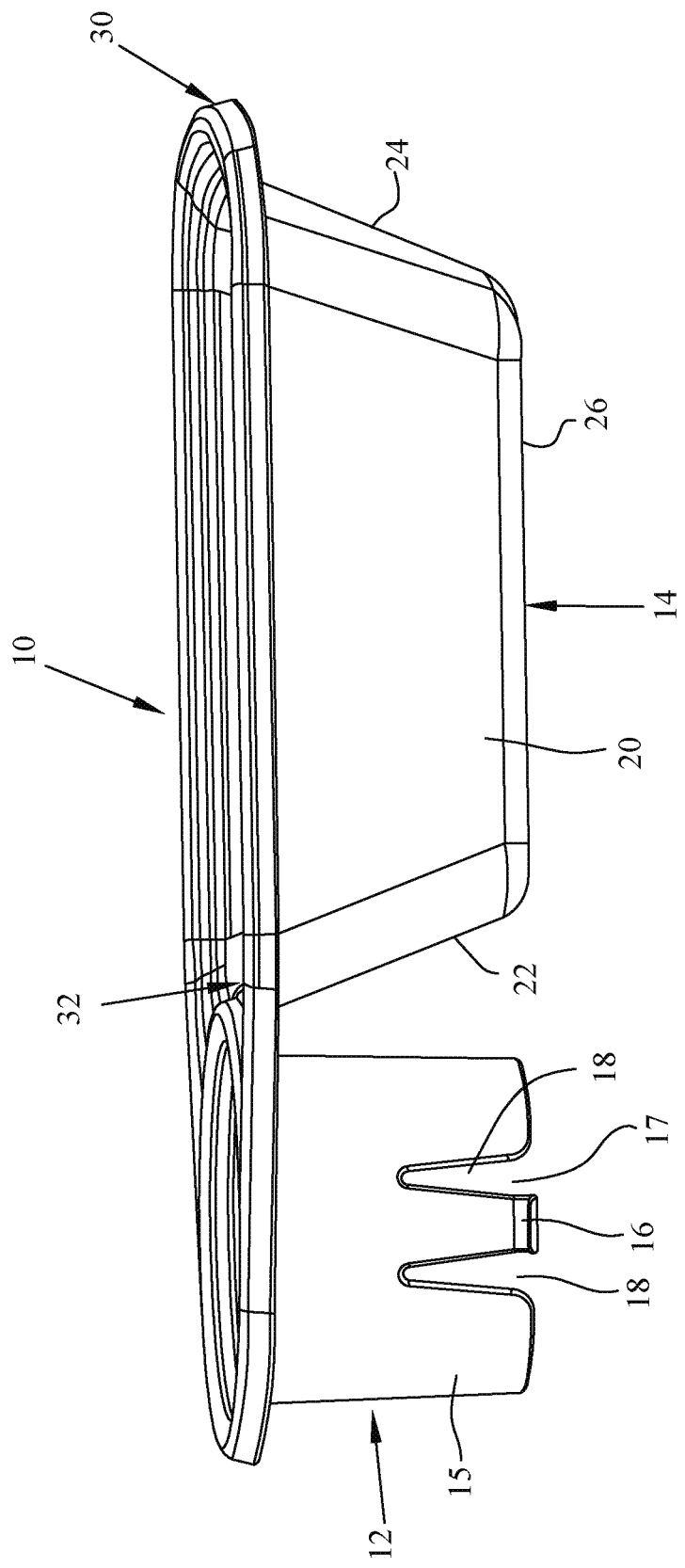
FIG. 9 is another side view of the food and drink holder of FIG. 1 with the food and drink holder tipped at a slight angle.
Figure 10:
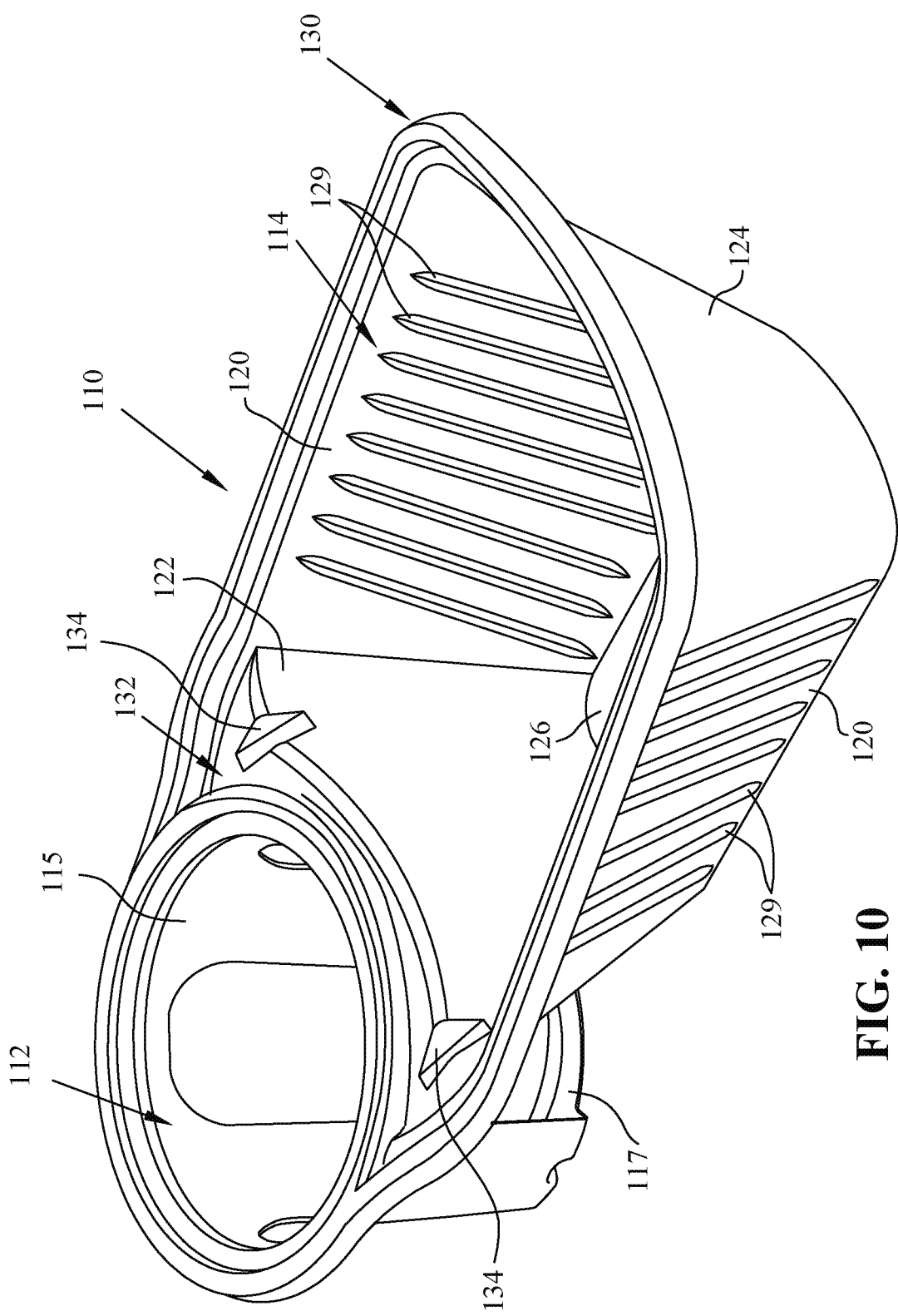
FIG. 10 is a perspective view of another embodiment of a food and drink holder including an angled side wall.

In an illustrated embodiment, the food receptacle section 14 is about three inches in height, as shown in FIG. 7. The width of the food receptacle section 14 is six inches, as seen in FIG. 8. The length of the food receptacle 14 is eight inches, as shown in FIG. 9. The dimensions are designed to fit a standard stadium serving dish 92, but the food receptacle 14 could be used without a serving dish. Also, other embodiments include varying sizes to accommodate other types of food carriers, such as a popcorn bowl.

As illustrated in FIG. 9, in an embodiment, the diameter of the cylindrical drink receptacle 12 section is about four inches. In other embodiments, the diameter is sized to accommodate a variety of drink sizes. Also, other embodiments can include a sleeve at the bottom of the drink receptacle 12 to support smaller drinks, cans, bottles, or the like. And other embodiments will include one or more tabs (not shown) in the interior of the drink receptacle to prevent smaller cups or bottled water from falling through the drink receptacle. These one or more tabs can be flexible enough to be pressed flat on the side wall to allow standard sized cups to be inserted in the drink receptacle.

Now referring to FIGS. 10-13, another embodiment of a food and drink holder is shown, generally indicted as 110. Food and drink holder 110 includes a drink receptacle 112 and a food receptacle 114. Drink receptacle 112 includes a sidewall 115, a bottom wall 117, and apertures 118 located partially in sidewall 115 and partially in bottom wall 117.

Food receptacle 114 includes a pair of sidewalls 120, a front wall 122, a rear or end wall 124 and a bottom wall 126. Bottom wall 126 includes indented ribs or stiffeners on the embodiment shown, but as should be appreciated, these ribs are optional. In the embodiment shown, food receptacle 114 also optionally includes cut-outs 129, which may optionally be indented ribs or stiffeners 129 in sidewalls 120.

Figure 11:
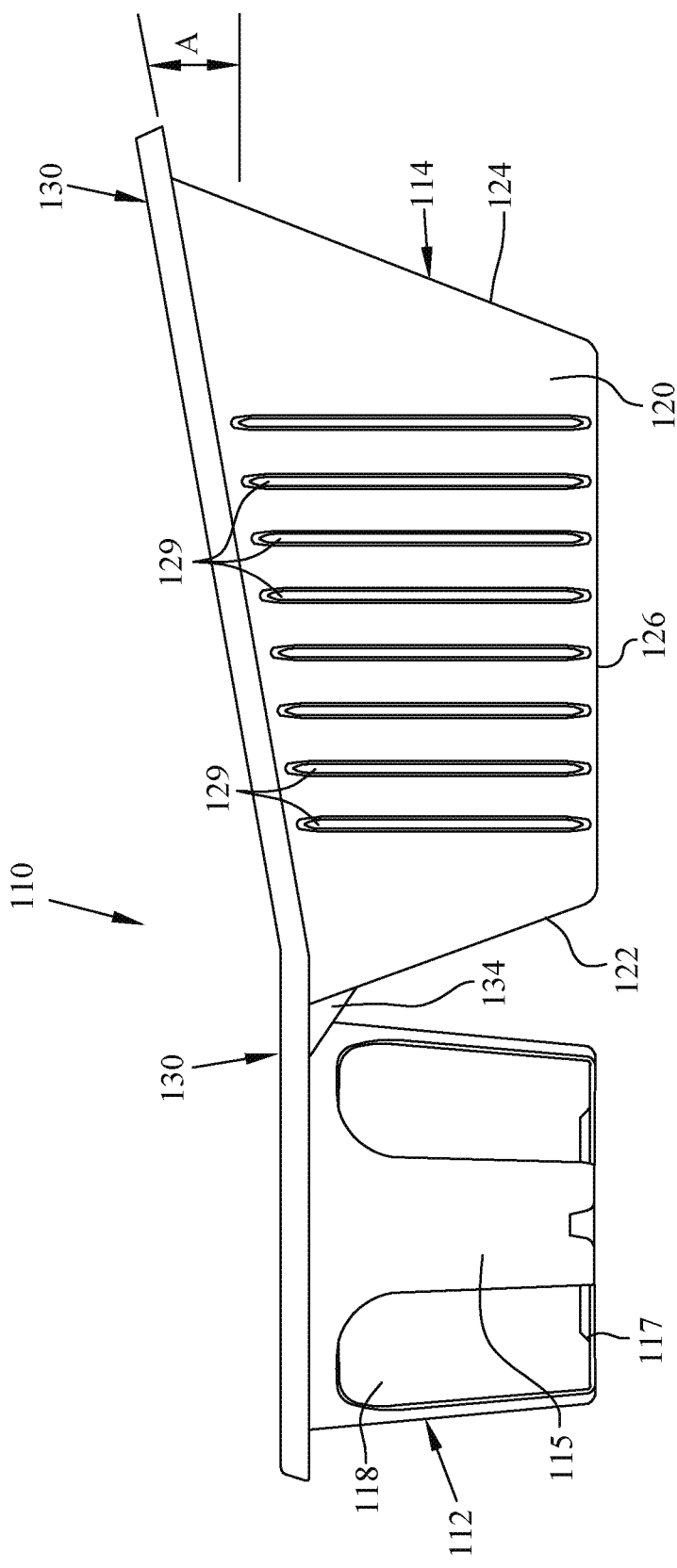
FIG. 11 is a side view of the food and drink holder of FIG. 10 depicting an angle between the top of the drink receptacle section and the food receptacle section.
Figure 13:
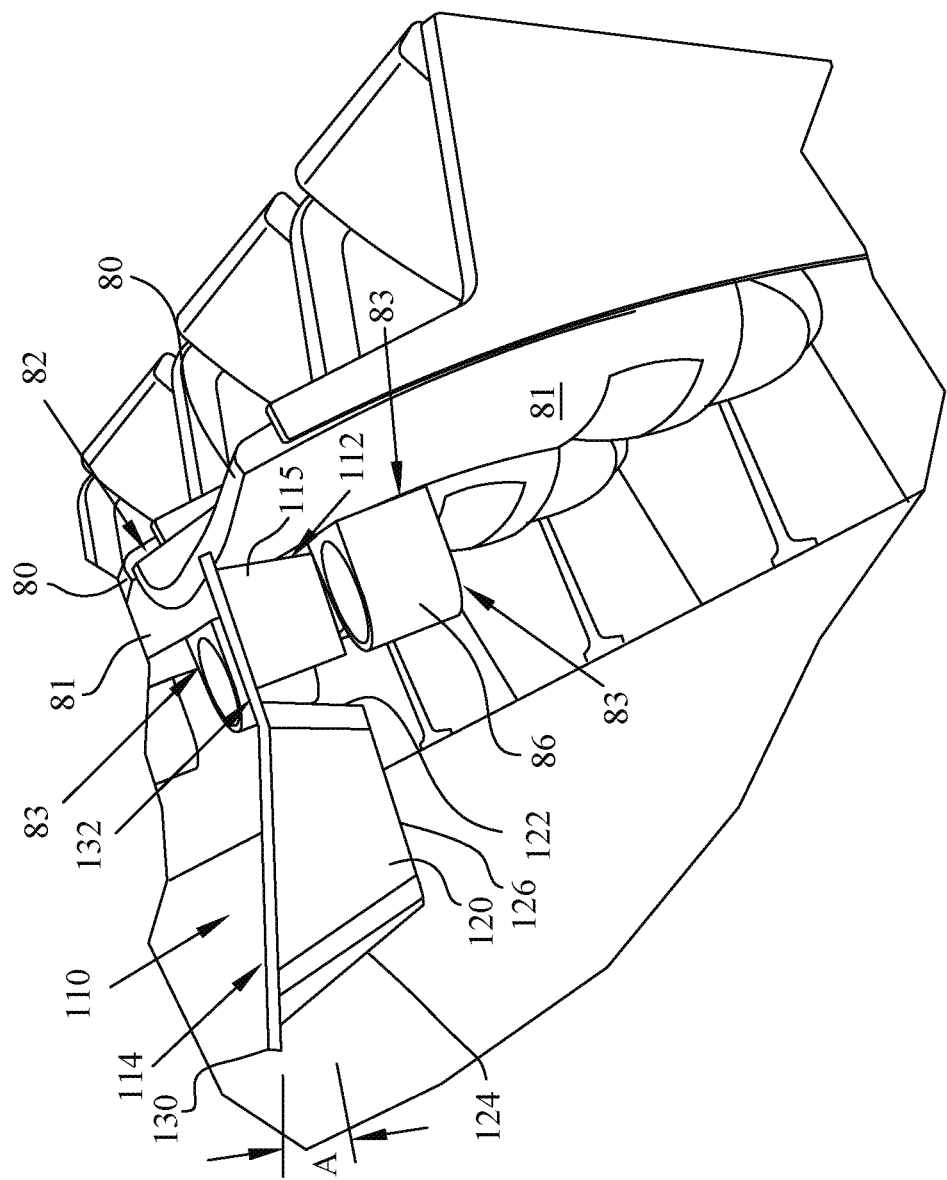
FIG. 13 is a side perspective view of the food and drink holder of FIG. 10 positioned to be inserted in a cup holder attached to the forward row of seats in a stadium seating venue.
Figure 14:
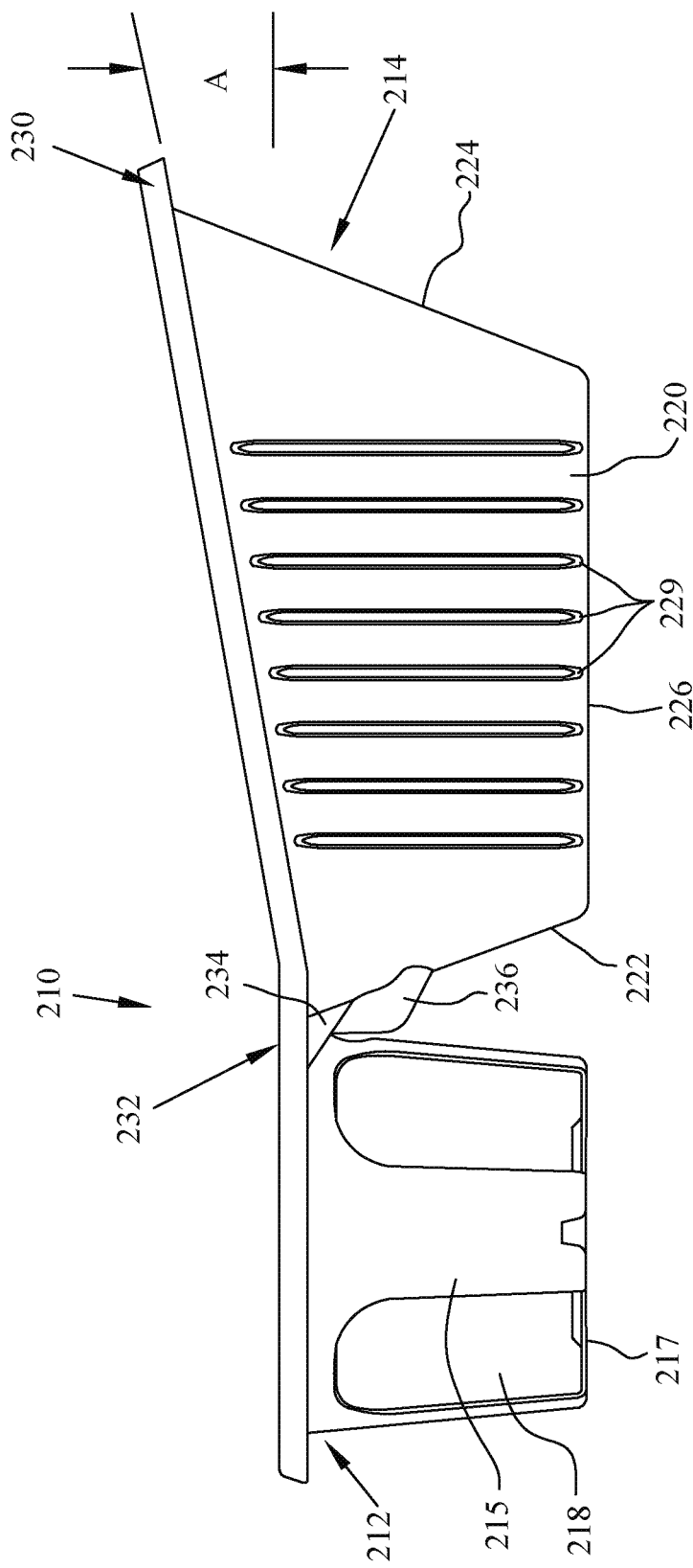
FIG. 14 is a side view of yet another embodiment of a food and drink holder depicting a brace between the food receptacle and drink receptacle to aid in securing the food and drink holder to a cup holder attached to seats.

Food and drink holder 110 also includes a collar, flange or lip 130 around the upper circumference thereof to provided stiffness and rigidity to the food and drink holder 10, as well as optional stiffeners 134. Drink receptacle 112 and food receptacle 114 are connected at or near the top of each (coinciding with flange 130), with connecting portion 132, but the receptacles 112 and 114 are not co-planar. As best shown in FIG. 11, the top of the food receptacle 114 extends at an angle A from the drink receptacle 112. Also, as should be appreciated, the angle A is less than perpendicular (or less than ninety degrees) to the central axis of sidewall 115 of drink receptacle 112. In the embodiment of food and drink holder 10 the top of This angle A between the top of the food receptacle 114 and the top of the drink receptacle 112 compensates, at least in part, for the angle at which cup holders 83 are typically attached to the seats 80 in stadiums and the like, as seen in FIG. 13 and discussed in greater detail below with respect to that figure. The angle A is selected to ensure that, when the food and drink holder 110 is inserted into cup holder 83, the contents of the food receptacle 114 do not spill over the sides 120 or end wall 124 of the food receptacle 114. Additionally, having the food receptacle 114 connected to the drink receptacle 112 at an angle A allows for the sides 120 of the food receptacle 114 to be shorter, thus reducing weight and reducing the amount of material needed. In one embodiment, the angle A between the top of the food receptacle 114 and the top of the drink receptacle 112 is about ten (10) degrees. Such an angle A is sufficient to compensate for the typical seventeen (17) degree angle at which the cup holder 83 is placed on the back of a stadium seat 80. In other embodiments, the angle A of the connection between the food and drink receptacles, 114, 12 respectively, can vary to compensate for different angles at which cup holders 83 can be attached to the seat, and may range from zero (0) degrees, where the top of the food receptacle 114 and the top of the drink receptacle 112 are co-planar, to less than ninety (90) degrees.

As discussed above, FIG. 11 is a side view of this embodiment of the food and drink holder 110, showing the angle A between the food receptacle 141 and the drink receptacle 112. In this embodiment, the sides 120 of the food receptacle 114 are taller or higher at the end 124 of the food receptacle that is distal from the drink receptacle 112. The sidewalls 120 of the food receptacle 114 increase in height such that the top of the food receptacle 114 (coinciding with flange 130) is approximately parallel to the ground when engaged with a cup holder 83, and the bottom 126 of the food receptacle 114 is co-planar with the bottom of the drink receptacle 112. The increased height of the side walls 120 offset the angle A of the cup holder 83. As shown, in this embodiment, the bottoms 126 and 117 of the food receptacle and the drink receptacle, respectively, are generally even or coplanar, allowing the food and drink holder 110 to rest evenly on a surface, such as a table.

Figure 12:
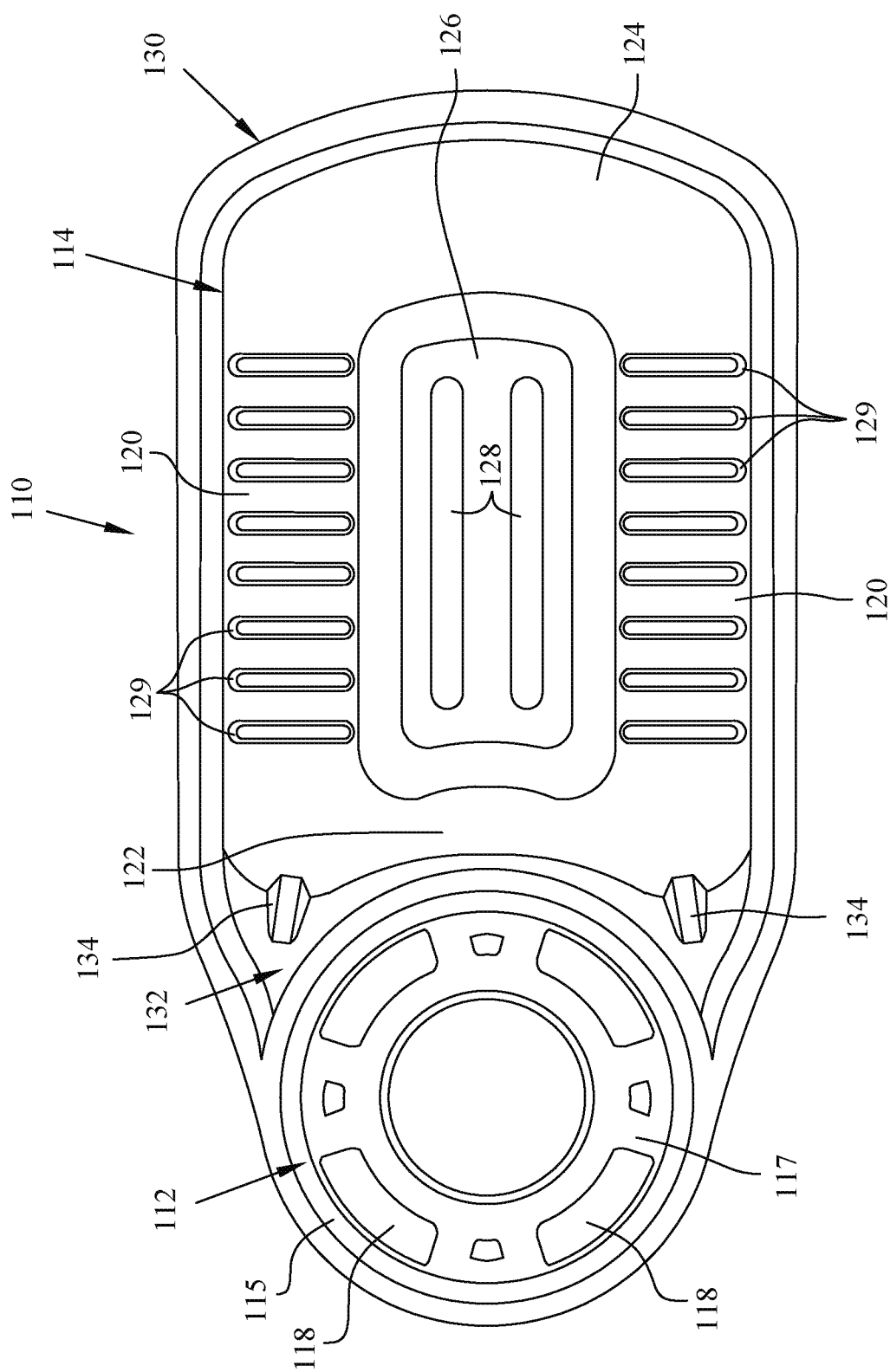
FIG. 12 is a top plan view of another embodiment of the food and drink holder of FIG. 10.

FIG. 12 is a top view of the food and drink holder 110 and shows the drink receptacle 112 connected to the food receptacle 114 with connecting portion 132. This embodiment does not include a locking mechanism or tabs to secure the drink receptacle section to the cup holder. However, the drink receptacle 112 includes the bottom surface 117 that supports drinks, including cups, bottles, cans, and the like. As illustrated in FIGS. 11 and 12, the sides 115 of the drink receptacle can include cut outs or apertures 118. These apertures 118 allow liquid spilled in the drink receptacle 112 to drain and reduce the amount and cost of materials used to form the food and drink holder 110. These apertures 118 also prevent a vacuum from forming between the cup 90, bottle, can, or the like and the food and drink holder 110. This reduces the chances of the food and drink holder 110 from being pulled out of the cup holder 83 when removing the cup 90, bottle, can, or the like. In additional embodiments, the food receptacle 114 may also include cut outs or apertures 129.

Referring to FIG. 13, the embodiment of the food and drink holder 110 is positioned to be seated in a cup holder 83. As shown, the cup holders 83 are attached to the stadium style seats 80 and are slightly angled away from the row of seats 80 to which they are attached and toward the row of seats 80 in the row behind. The cup holders 83 are attached to the backs 81 of the stadium seats 80 and are designed to be used by individuals seated in the row behind the seats 80 to which the cup holders 83 are attached. The angle of the cup holders 83 allow the user, seated in the row behind, to easily slide drinks 90 into and out of the cup holders 83.

In the illustrated embodiment, the angle A between the drink receptacle 112 and the food receptacle 114 results in a food receptacle 114 that is approximately parallel to the ground when the drink receptacle 112 is seated within the cup holder 83. The angle A in the structure of the food and drink holder 110 offsets the angle of the cup holder 83. As a result, the top of the food receptacle 114 (coinciding with flange 130) is approximately parallel to the ground, or at least at a lesser angle than the cup holder 83. With this configuration, the food receptacle section 114 is better able to hold food and less likely to spill the contents of the food receptacle.

Figure 15:
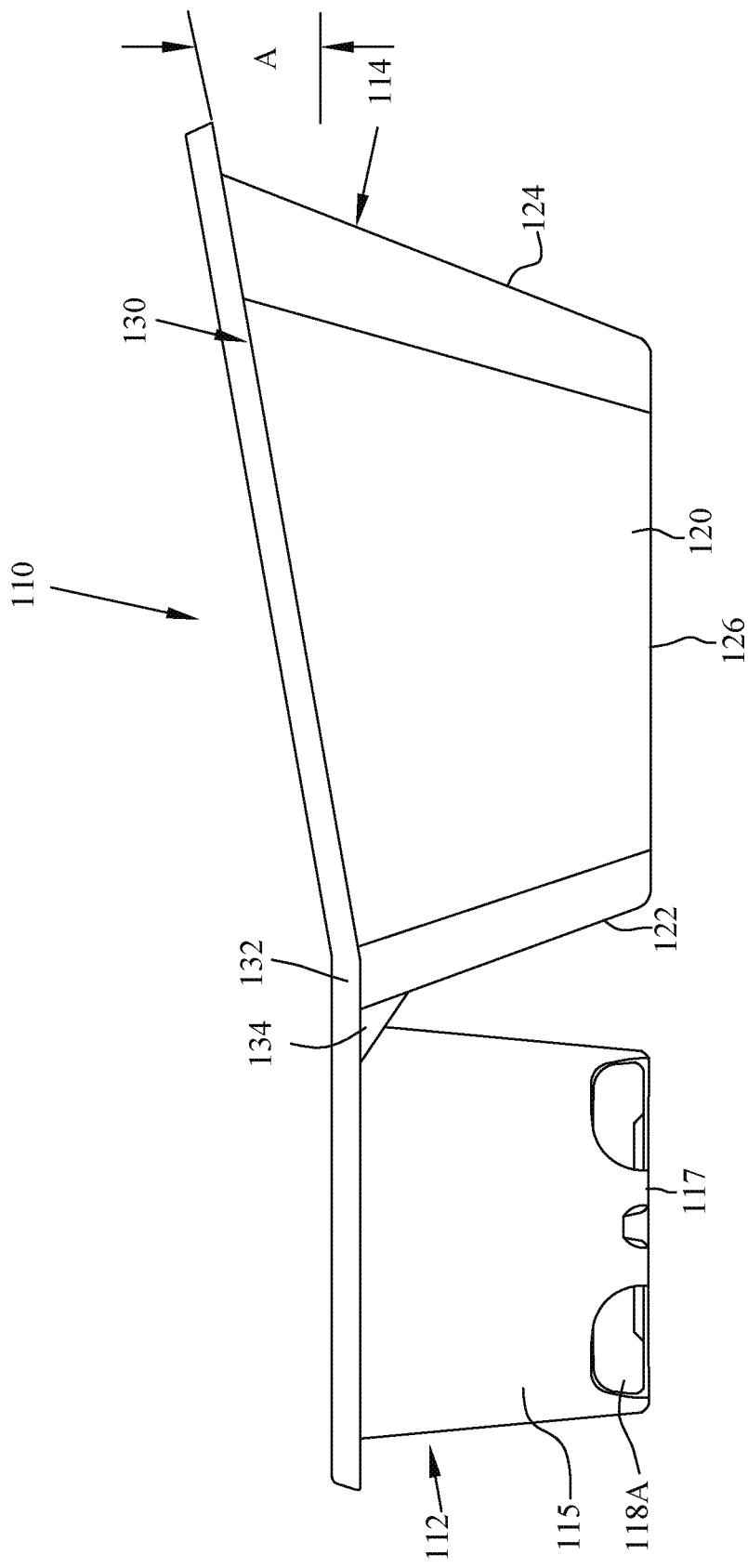
FIG. 15 a side view of the food and drink holder of FIG. 10, but depicting alternate apertures in the drink receptacle section.
Figure 16:
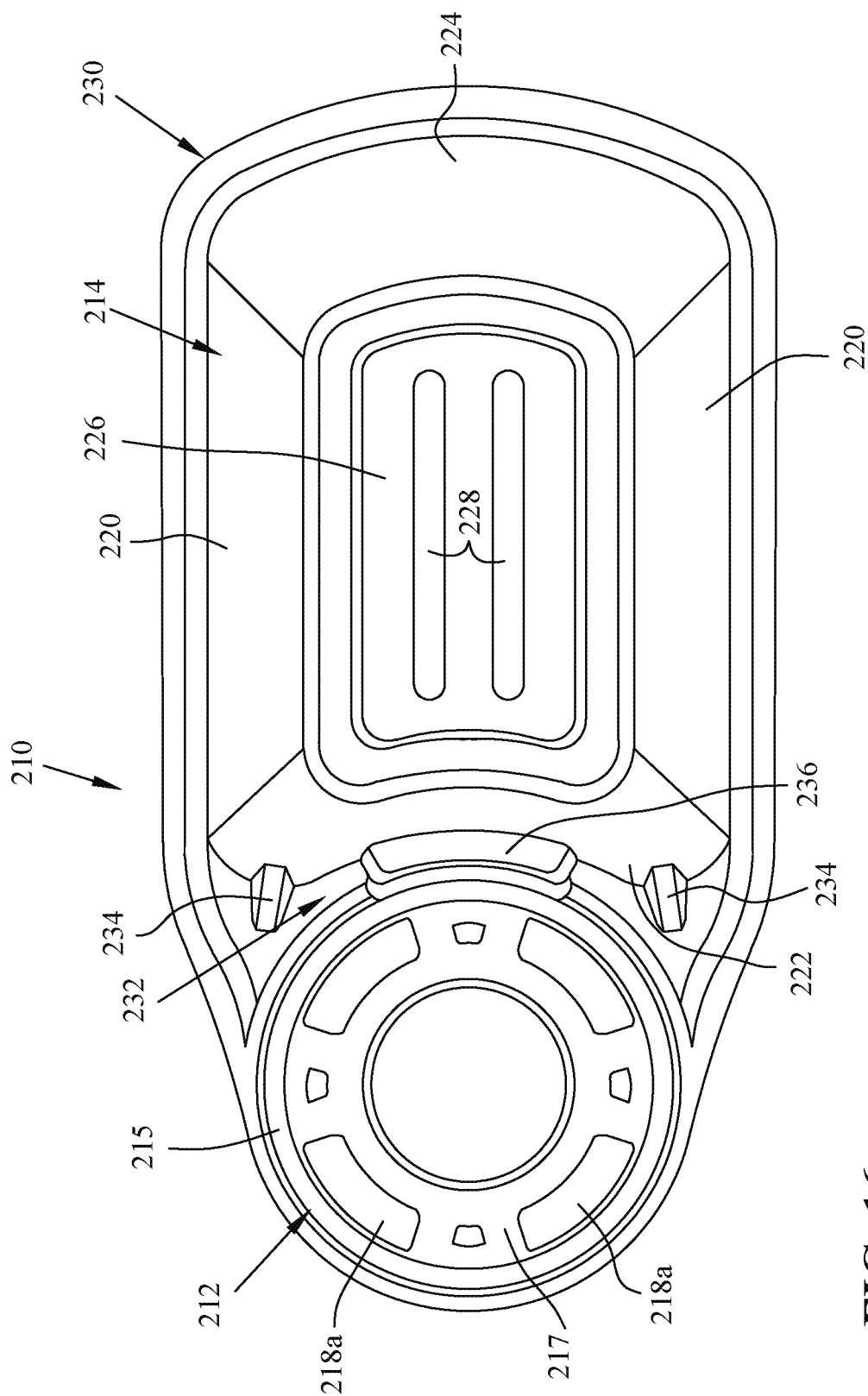
FIG. 16 is a bottom plan view of the food and drink holder of FIG. 14.
Figure 17:
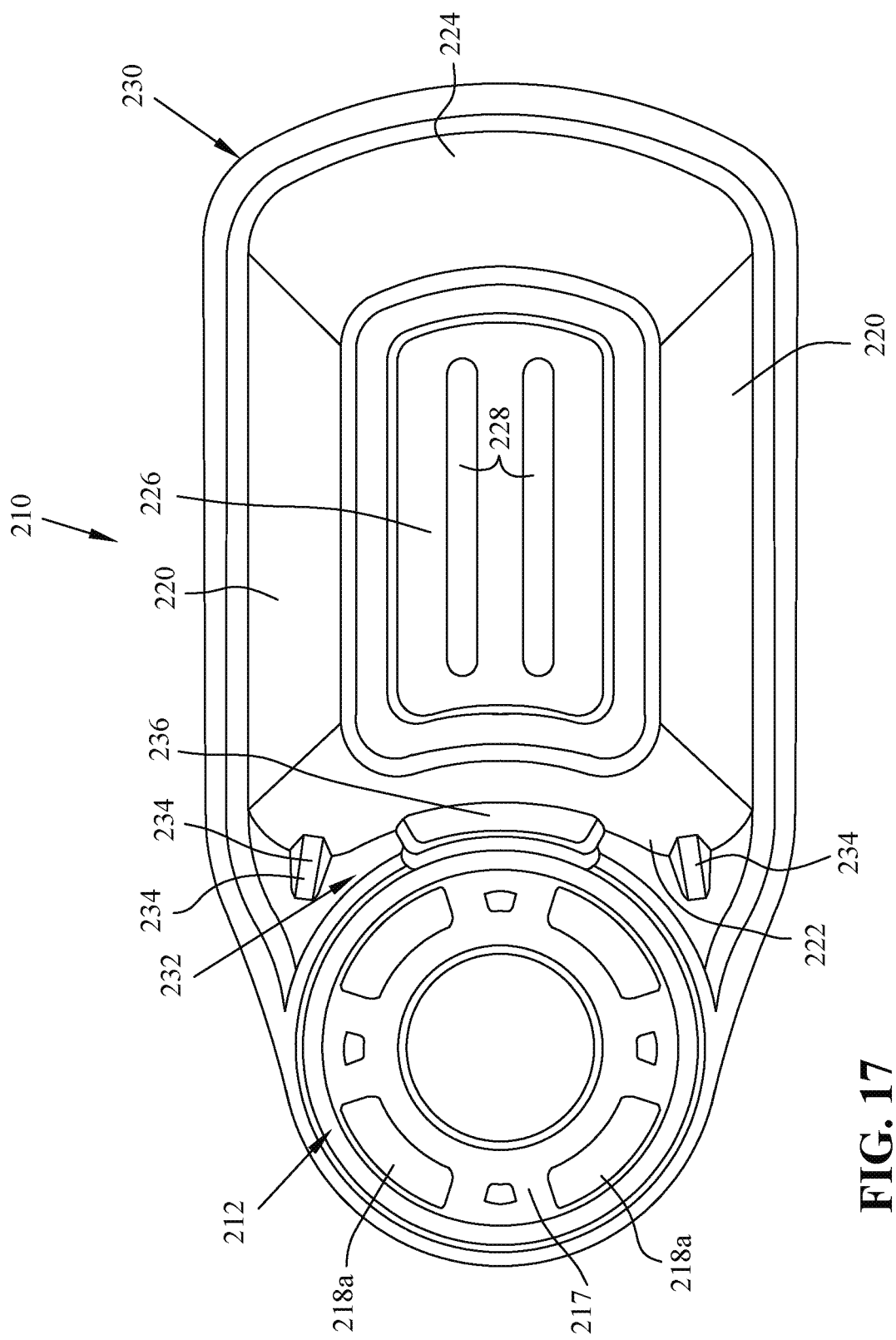
FIG. 17 is a top plan view of the food and drink holder of FIG. 14.
Figure 20:
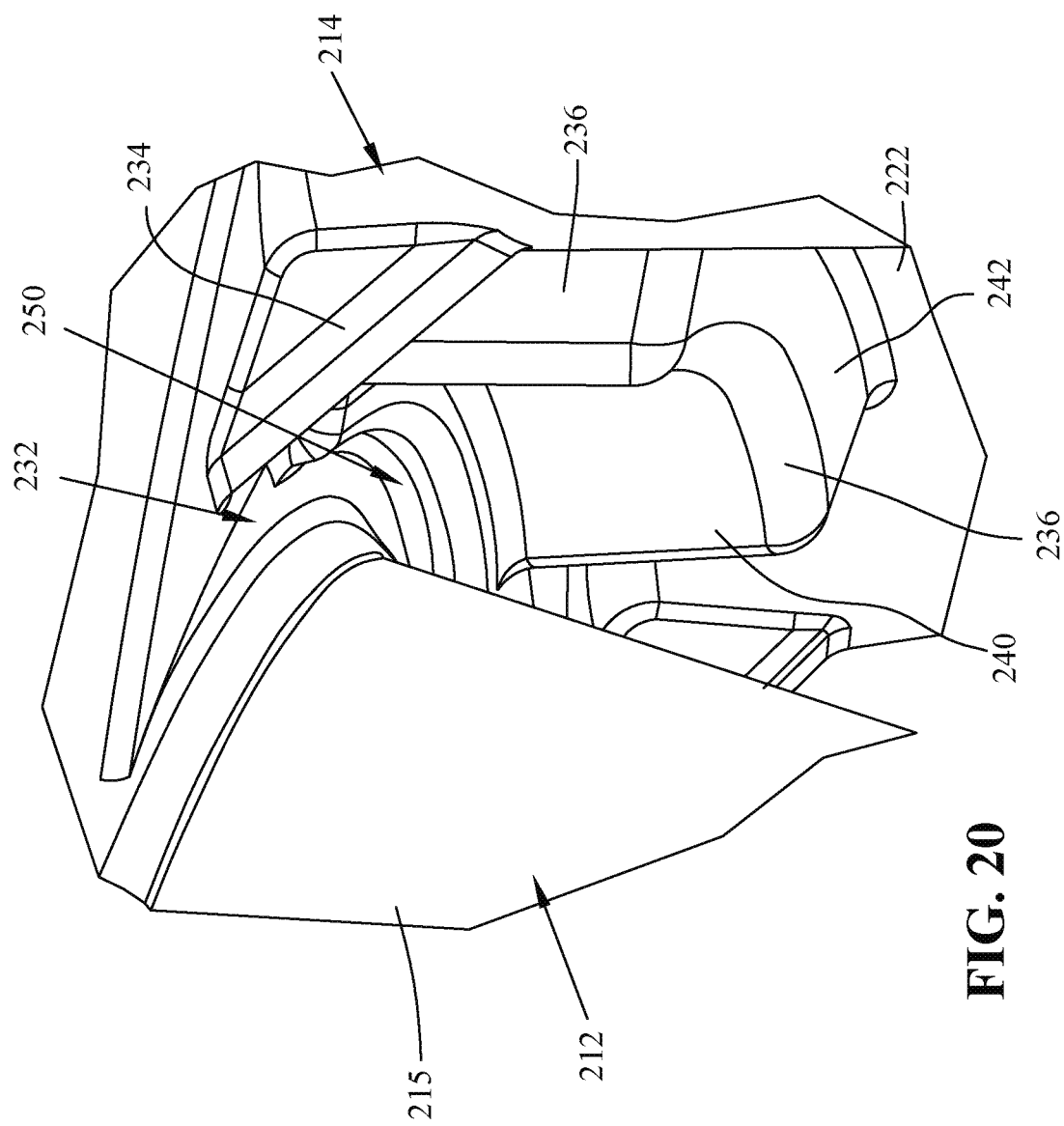
FIG. 20 is another enlarged side perspective view of the brace of the food and drink holder of FIG. 14.
Figure 21:
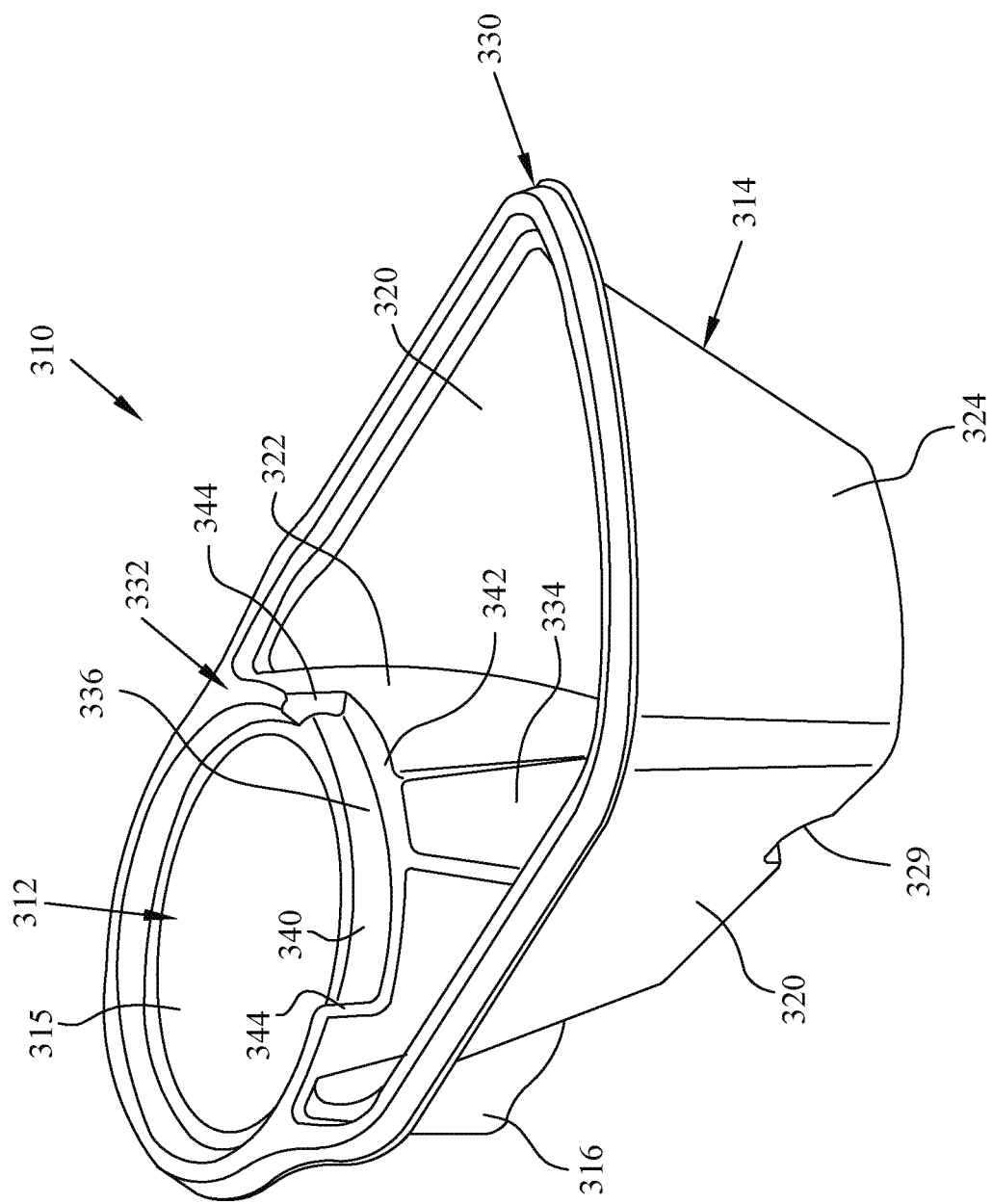
FIG. 21 is a perspective view of still another embodiment of a food and drink holder including an angled side wall and indentations rather than apertures in the side wall of the drink receptacle section.

Referring now to FIG. 15, food and drink holder 110 is shown with alternate apertures 118a in drink receptacle 115. It should be appreciated that the features in the various embodiments herein, may be utilized in one another. For instance, apertures 118a may be used in any of the embodiments of the food and drink holders herein.

FIGS. 14 and 16-20 show other embodiments of a food and drink holder 210, where a brace is attached to a food receptacle 214 and is positioned between the food receptacle 214 and a drink receptacle 212. Drink receptacle 212 includes a sidewall 215, a bottom wall 217 and apertures 217 extending into sidewall 215 and bottom wall 217.

Food receptacle 214 includes a pair of sidewalls 220, a front wall 222, a rear or end wall 214, and a bottom wall 226. Bottom wall 226 may optionally include ribs or stiffeners 228 and sidewall 220 may optionally include either cut-outs or indented ribs 229. Food and drink holder 210 includes a collar, flange or lip 230 extending about the upper circumference thereof for rigidity and stiffness and may include stiffeners 234. Brace 236 is located in front wall 222. The brace 236 can be formed as a notch or fold in the wall of the food receptacle. The brace 236 is positioned to provide support for the food receptacle 214 and reduce stress on the connecting portion 232 between the food and drink receptacle 214 and 212, respectively, by engaging the sidewall of cup holder 83 to maintain the food receptacle's 214 position approximately parallel to the ground. The position of the brace 236 is designed to maintain an ergonomic design, where a finger can be slid between the receptacles for ease of carrying the food and drink holder.

Now referring to FIGS. 21-27, yet another alternate embodiment food and drink holder, generally indicated as 310, is disclosed. Food and drink holder 310 includes a drink receptacle, generally indicated as 312, and a food receptacle, generally indicated as 314. Drink receptacle 312 includes a generally cylindrical sidewall 315 and a bottom wall 317. Drink receptacle 312 also includes indentations 316 extending inwardly from sidewall 315 and bottom wall 317. The embodiment depicted, indentations 316 have a generally L-shaped configuration for reasons discussed herein; however, it should be appreciated that other shapes and forms of indentations may be utilized. As should be appreciated, indentations 316 extending inward of sidewalls 315 facilitate grasping a cup 90 inserted therein to hold it firmly in the drink receptacle 315. Drink receptacle 312 also includes apertures 318 in bottom wall 317 to allow any spilt beverages to drain from drink receptacle 112, as well as preventing a vacuum from being formed when drink receptacle 312 is inserted into a cup holder 83 in seats 80.

Figure 22:
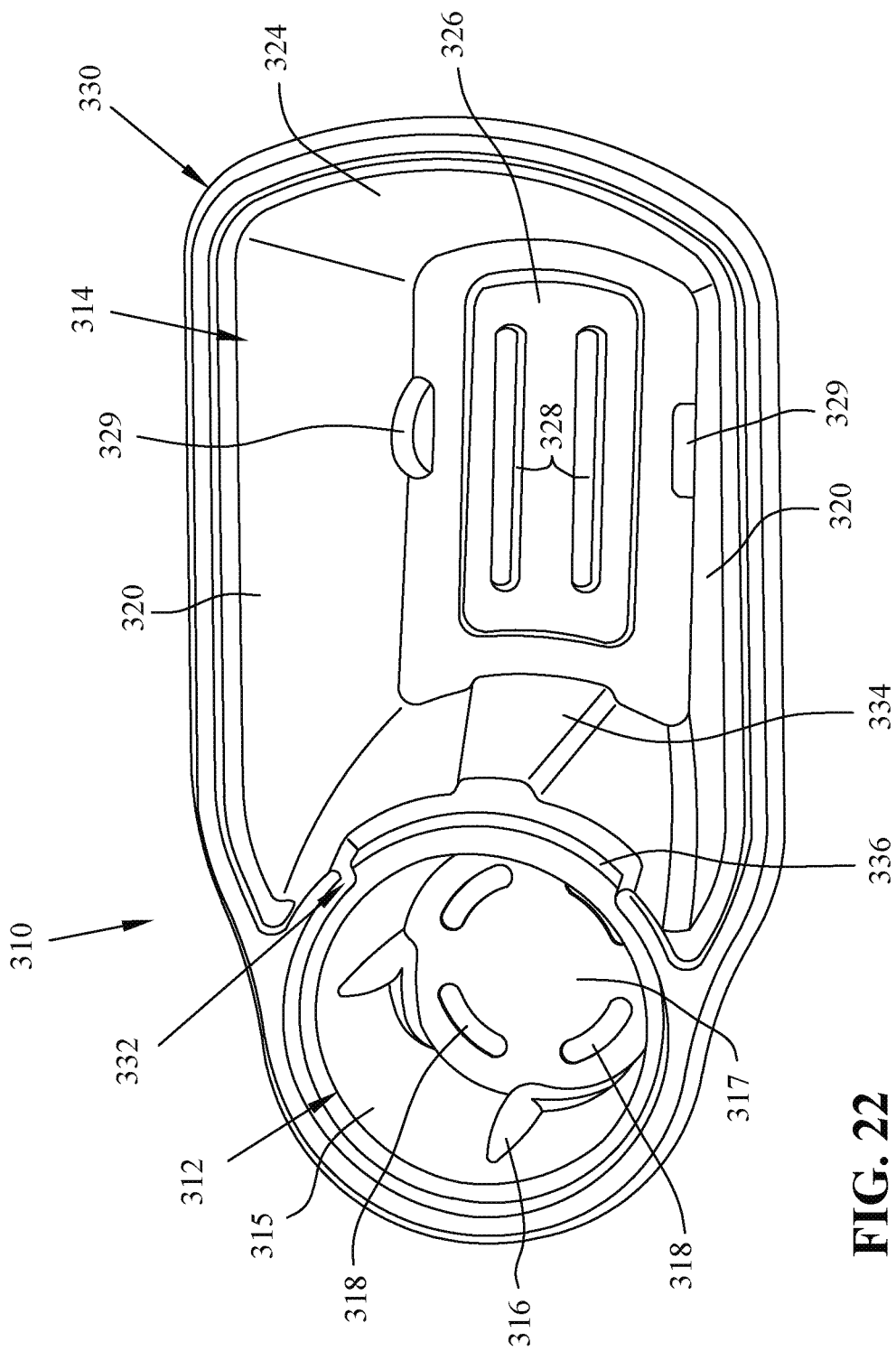
FIG. 22 is a top perspective view of the food and drink holder of FIG. 21.
Figure 23:
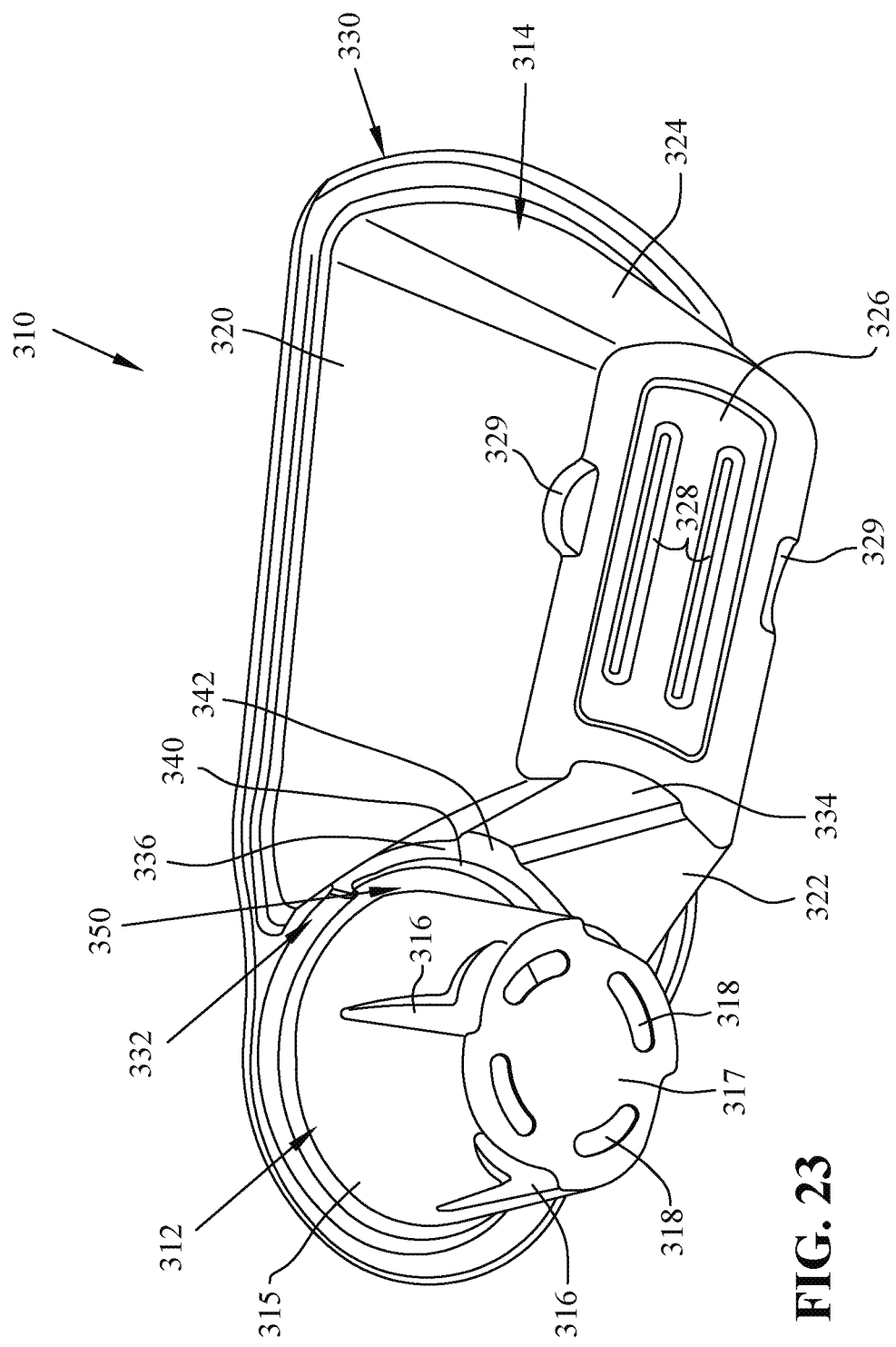
FIG. 23 is a bottom perspective view of the food and drink holder of FIG. 21.
Figure 24:
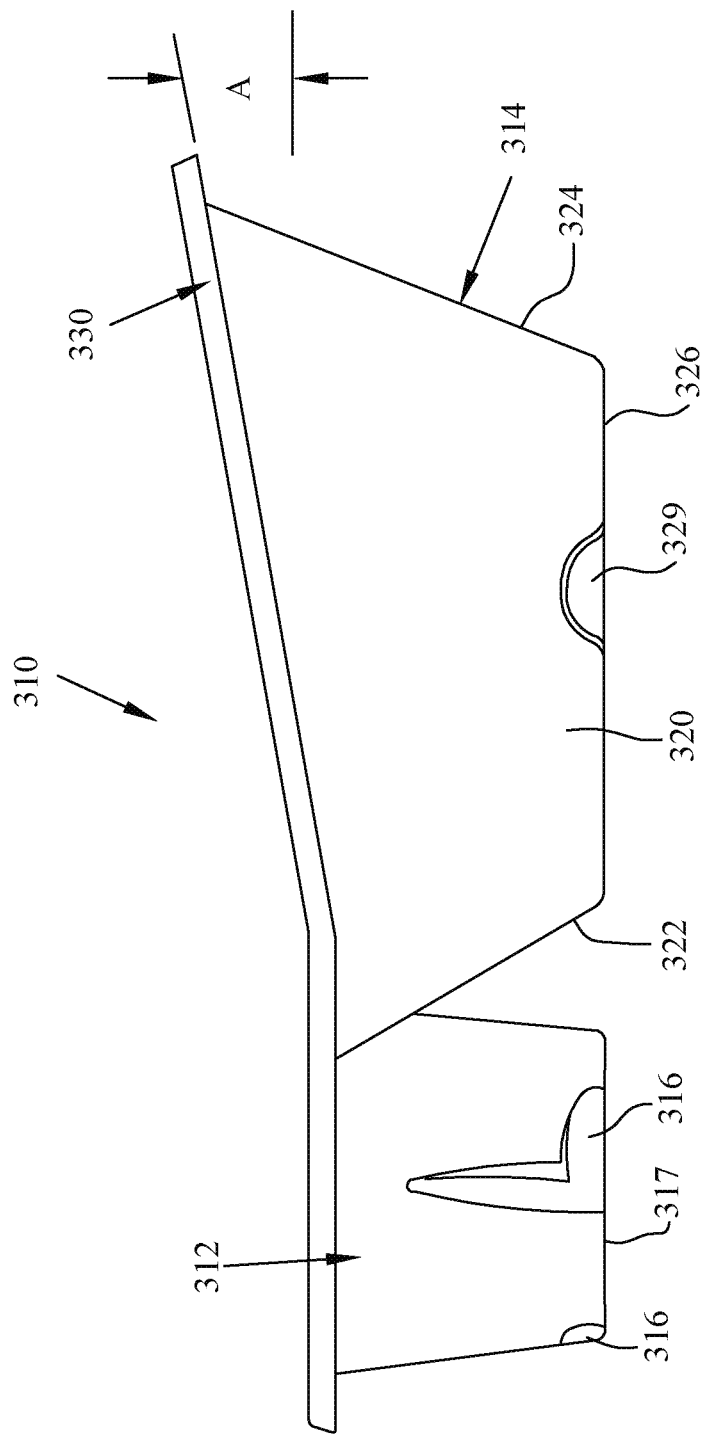
FIG. 24 is a side view of the food and drink holder of FIG. 21.
Figure 25:
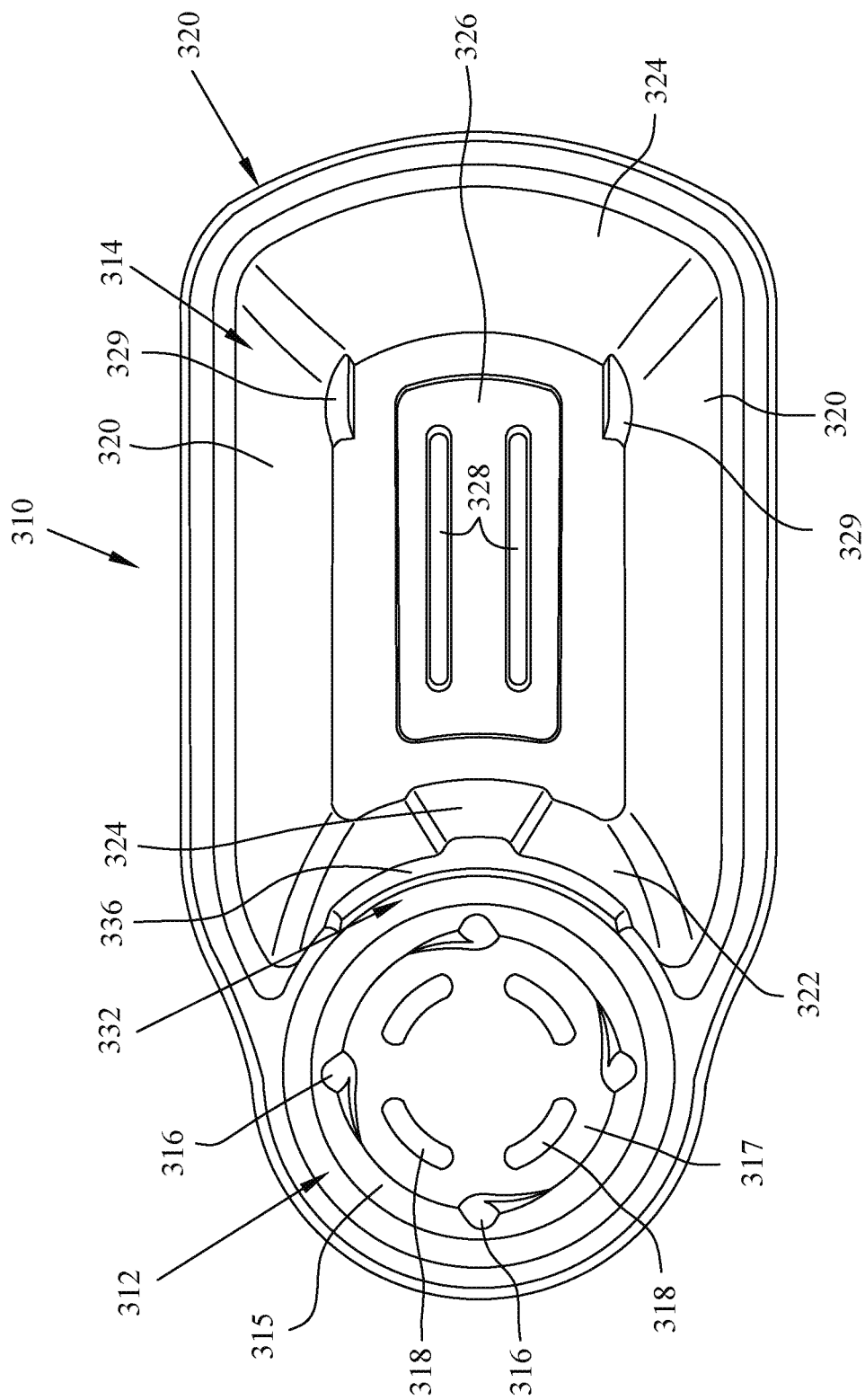
FIG. 25 is a top plan view of the food and drink holder of FIG. 21.
Figure 26:
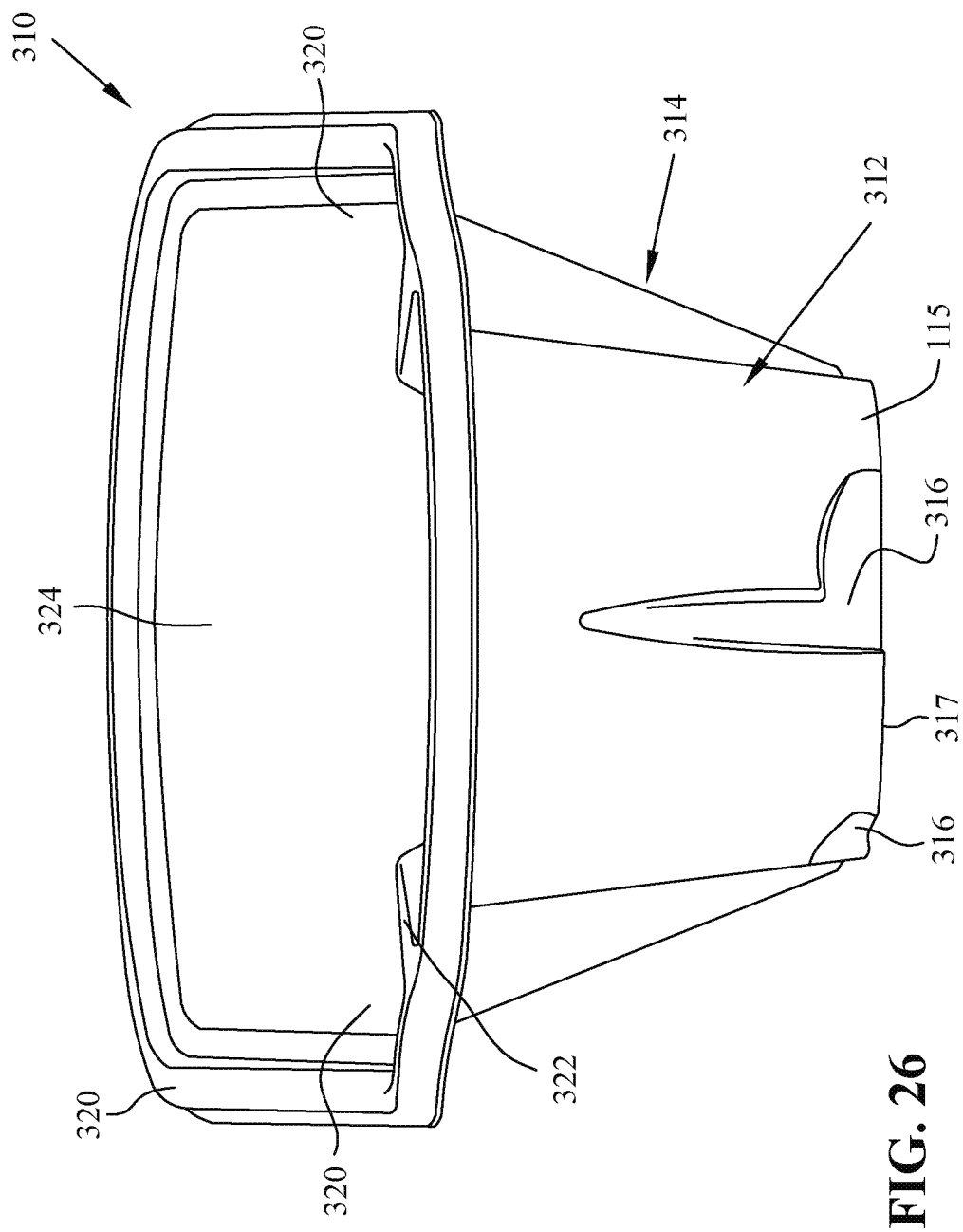
FIG. 26 is an end view of the food and drink holder of FIG. 21 looking towards the drink receptacle section.
Figure 27:
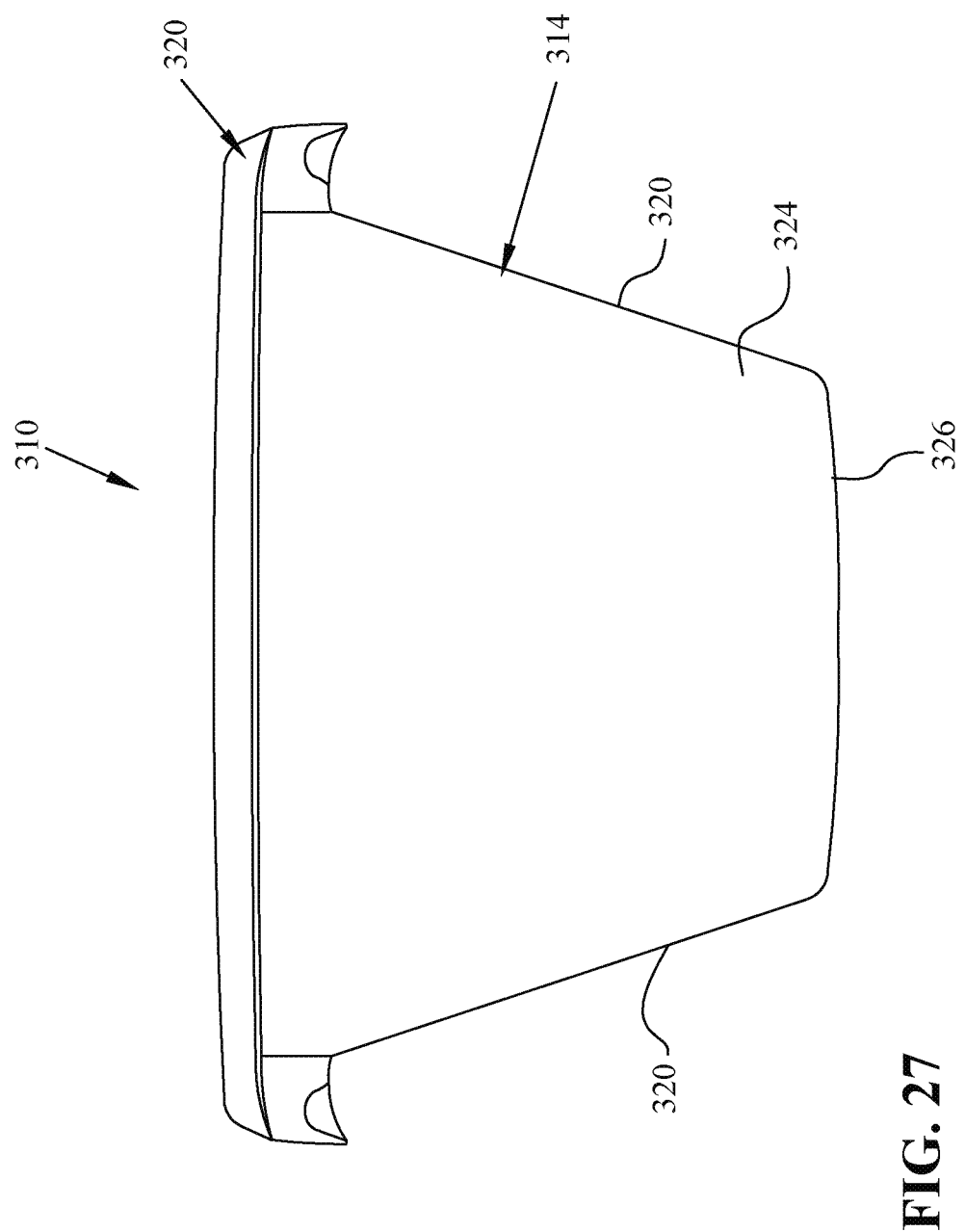
FIG. 27 is an opposite end view of the food and drink holder of FIG. 21 looking towards the food receptacle section.

Food receptacle 314 includes a pair of angled sidewalls 320, which are higher at an end of the food receptacle 314 distal to drink receptacle 312 for reasons stated above and below. Food receptacle 314 also includes a front wall 322, an end wall 324, and a bottom wall 326. Bottom wall 326 may include indented ribs or stiffeners 328 for purposes of providing additional support to food and drink holder 310. Sidewalls 320 and bottom wall 326 also include indentations 329, which in the embodiment shown; have a generally half wheel or half cylindrical configuration. It should be appreciated that indentations 329 may be placed more centrally located in sidewall 320 and bottom wall 326 as shown in FIGS. 22-24 or closer to end wall 324 as shown in FIG. 25. This helps facilitate better stacking/later separation of the food and drink holders as discussed below. The orientation of indentations 316 can also be inverted, in particular, the direction in which the bottom of the L extends around sidewall 315 of drink receptacle 312 may alternate from tray to tray as the position of indentations 329 also alternate for stacking and separation purposes.

Similar to the previous embodiments, food and drink holder 310 includes a collar, flange or lip 320 extending around an upper or top circumference thereof to provide rigidity and stiffness to food and drink holder 310 in order that it will not collapse when holding food items in food receptacle 314 and supported in a cup holder 83 by drink receptacle 312. Food and drink holder 310 also includes a connecting portion 332 connecting drink receptacle 312 and food receptacle 314. In the embodiment shown, food and drink holder 310 also includes an indented stiffener 324 in front wall 322. In this embodiment, stiffener 334 is angled so that it is wider at bottom 326 than at the top of wall 324. Food and drink holder 310 also includes a brace 336 which includes a front wall 340, a bottom flange 342 and side ledges 344. Brace 336 extends for a longer length around drink receptacle 312 than brace 236 in addition, and front wall 340 is shown having a shorter height than front wall 240 in brace 236. A space 350 is located between brace 336 and sidewall 315 of food receptacle 312 to facilitate mounting a top lip of cup holder 83 therein, so that drink and food holder 312 is held from securely thereon between sidewall 315 and front wall 340 of brace 336.

Figure 28:
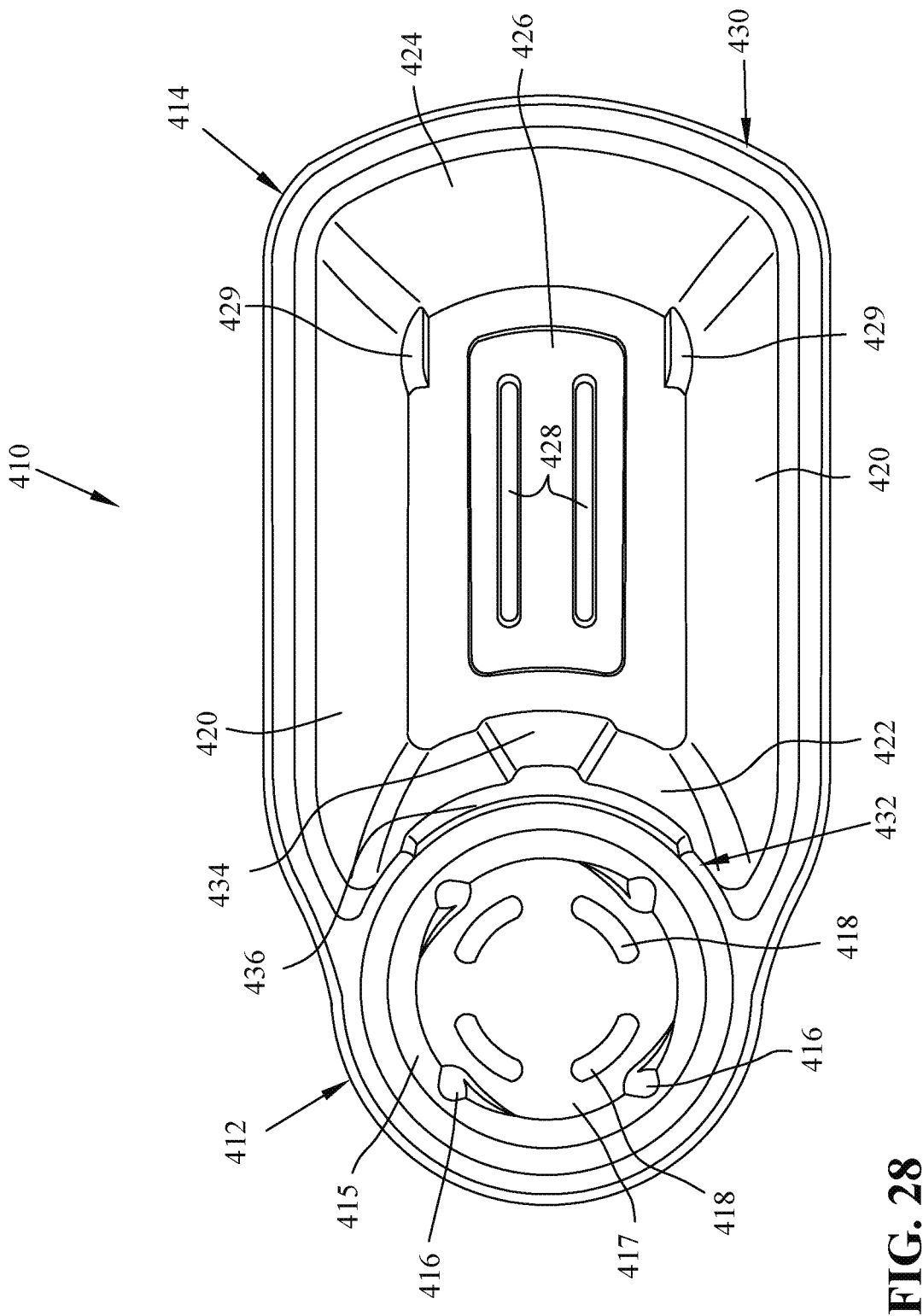
FIG. 28 is a top plan view of yet another embodiment of a food and drink holder with the indentations rotated 45 degrees about the drink receptacle section.

Now referring to FIG. 28, still another embodiment of a food and drink holder, generally indicated as 410, is shown. Food and drink holder 410 includes a drink receptacle, generally indicated as 412, and a food receptacle, generally indicated as 414. Drink receptacle 412 includes a generally cylindrical sidewall 415, a bottom wall 417, generally L-shaped indentations 416 and apertures 418 in bottom wall 417. In food and drink holder 410, indentations 416 are rotated 45° about the circumference of sidewall 415 (as compared to indentations 316 in drink receptacle 312), so that no indentation is directly central to a longitudinal axis of food and drink holder 410. This allows the sidewall 415 to be closer along a longitudinal axis to cup holder 83, in which food and drink holder 410 will be mounted, thereby more firmly holding food and drink holder 410 therein and preventing rocking thereof.

Food receptacle 414 of food and drink holder 410 includes a pair of sidewalls 420, a front wall 422, a rear or end wall 424 and a bottom wall 426. Stiffening ribs 428 may be included in bottom wall 426. Indentations 429 are located in sidewalls 420/bottom wall 426. Food and drink holder 410 also includes a collar, flange or lip 430 extending around an upper circumference thereof and a connecting portion 432 connecting drink receptacle 412 to food receptacle 414. Food receptacle 414 includes a stiffener 434 similar to stiffener 334 on food and drink holder 310 and located in front wall 422. Food and drink holder 410 also includes a brace 436.

Figure 29:
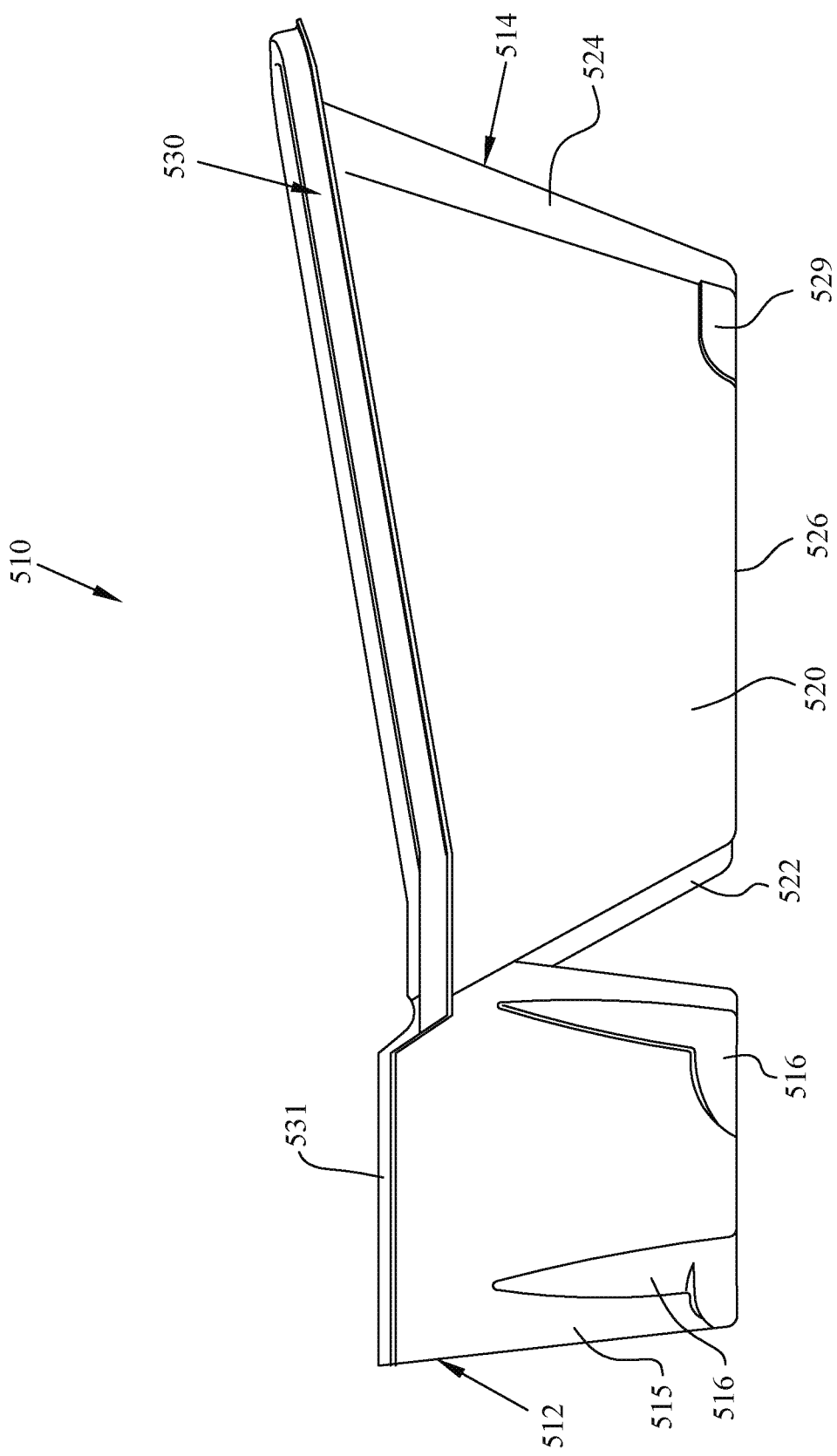
FIG. 29 is a side view of an additional embodiment of a food and drink holder in accordance with the subject invention.

Now referring to FIG. 29, still another embodiment of a food and drink holder, generally indicated as 510, is disclosed. Food and drink holder 510 includes a drink receptacle, generally indicated as 512, and a food receptacle, generally indicated as 514. Drink receptacle 512 includes sidewalls 515 and indentations 516, similar to indentations 416 in the embodiment of food and drink holder 412. Food and drink holder 510 also includes sidewalls 520, a front wall 522, a rear or end wall 524, and a bottom wall 526. Indentations 529 are located in sidewalls 520 and bottom wall 526. Food and drink holder 510 also includes a collar, lip, or flange, generally indicated as 530; however, as compared to the other embodiments, flange 530 transitions around the connecting portion between drink receptacle 512 and food receptacle 514 such that it becomes upturned and flairs or extends further up on sidewall 515 and only a small lip 531 is formed about sidewall 515. This transition and extended area on sidewall 515 facilitates drink receptacle 512 being received and seated further in and more secure in cup holder 83.

In embodiments, the food and drink holder can be stackable, for increased efficiency in shipping. As discussed above, indentations 316, 416, and 516 have a generally L-shaped configuration in the embodiments shown, but on alternate stacked food and drink holders, the orientation of the bottom of the L on the sidewall of the drink receptacle may be varied. Likewise, in alternate stacked food and drink holders, indentations 329, 429, and 529 may be alternated from a middle of the sidewalls/bottom wall towards the end wall of the food receptacle. As should be appreciated, if alternate stacked trays have the placement/orientation of the indentations vary, this provides a slight offset so that the trays do not rest completely to the bottom of one another thereby creating a small space between the flanges on stacked trays. Accordingly, when it is time to utilize and/or remove the food and drink holders from one another at a concession stand, it will be easy for the server to remove the top food and drink holder from the stack by being able to readily grasp it beneath the flange and pull from the other food and drink holders in the stack.

Figure 30:
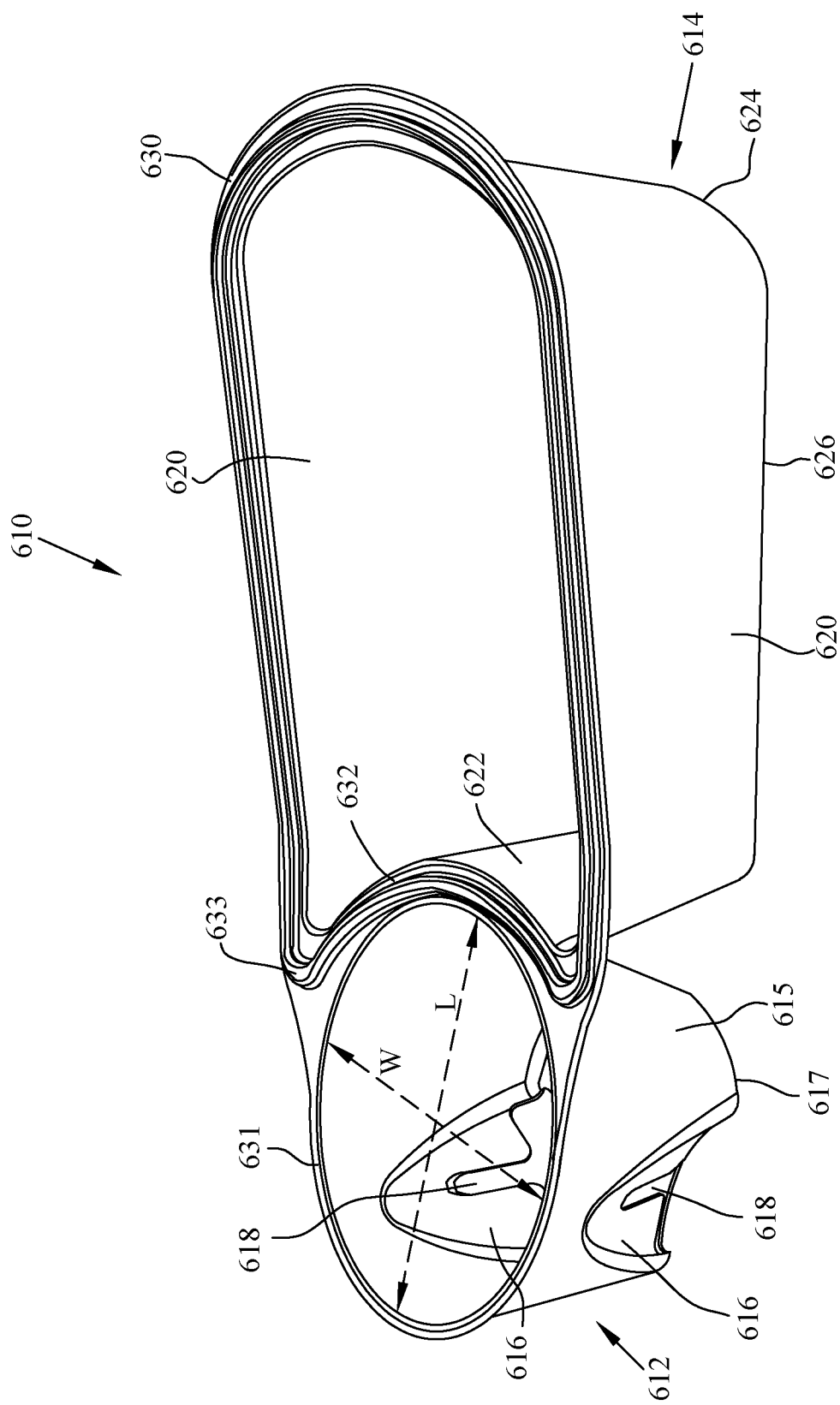
FIG. 30 is a perspective view of another embodiment of a food and drink holder including an angled top end and oval shaped drink holder.
Figure 31:
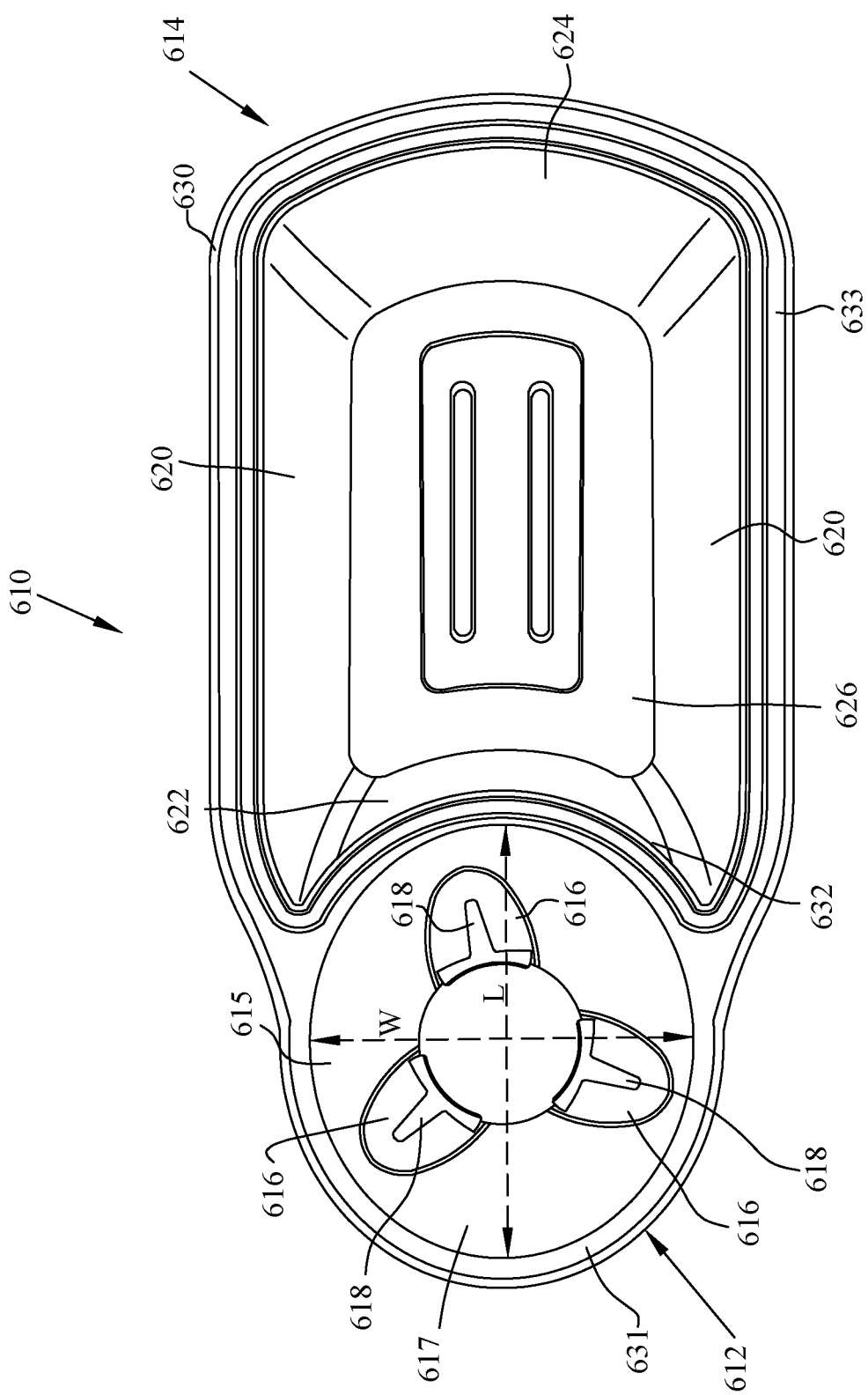
FIG. 31 is a top plan view of the food and drink holder of FIG. 30.
Figure 32:
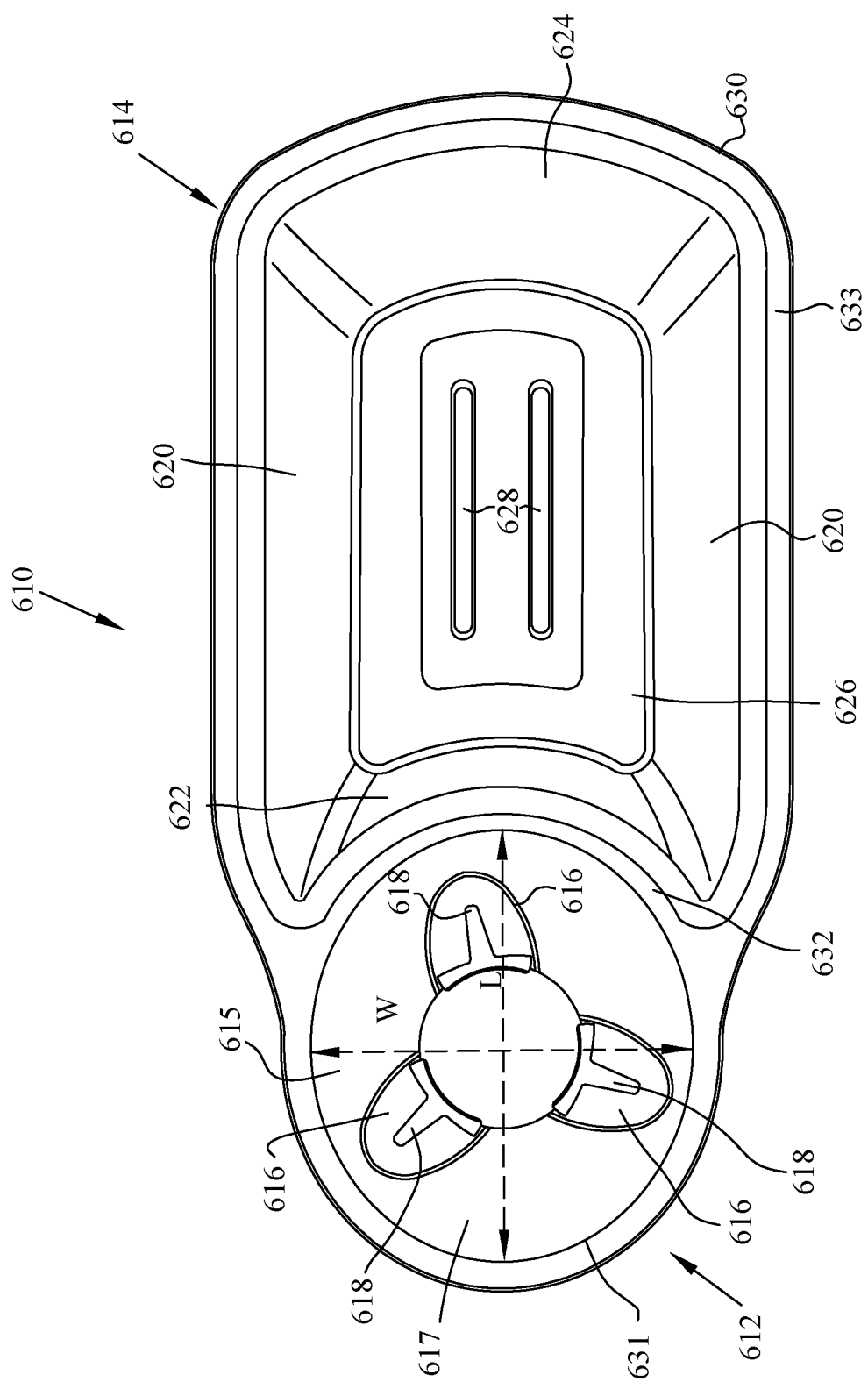
FIG. 32 is a bottom plan view of the food and drink holder of FIG. 30.

Now referring to FIGS. 30-32, another embodiment of food and drink holder, is generally indicated as 610. Food and drink holder 610 includes a generally oval-shaped drink holder or receptacle, which is generally indicated as 612, and a generally rectangular food holder or receptacle, which is generally indicated as 614. Drink receptacle 612 has a generally oval shaped sidewall 615 having indentations 616 spaced there about. In the embodiment shown, there are three (3) indentations 616 which are spaced approximately 120 degrees apart, with one being generally towards the rear of the drink receptacle closest to or adjacent to the food receptacle 614. Food and drink holder 610 also includes apertures or cutouts 618 located in indentations 616 and also in a portion of a bottom wall 617 of drink receptacle 612. In the embodiment shown, apertures 618 have a generally inverted T-shaped configuration.

Food receptacle 614 includes a pair of sidewalls 620, an angled front wall 622, and an end wall 626. A flange 630 extends around the top of food receptacle 614. An upturned lip 631 extends around the majority of the drink receptacle 612, except where a connecting portion 632 joins drink receptacle 612 and food receptacle 614. Food receptacle 614 may also include longitudinally extending ribs 628 (see FIG. 32) for providing additional structural rigidity to the food receptacle. Food and drink holder 610 also includes a continuous rib 633 extending around flange 630 and connecting portion 632 as best shown in FIGS. 30 and 31.

As noted, drink receptacle 612 has a generally oval-shaped configuration such that the length L of the drink receptacle is longer from the front to back of the drink receptacle 612 than it is across a width W as shown in FIGS. 30-32. The features of this drink and food holder provide many advantages including that the thin continuous rib 633 increases strength while still allowing clearance for insertion into cup holders. Also, the small lip 631 around the top of drink receptacle 612 allows drink receptacle 612 to be inserted into cup holders with very little clearance. The oval opening at the top of drink receptacle 612 allows the drink receptacle to fit various sized cup holders. Inserting the drink receptacle into a cup holder causes the oval shape to distort to the shape of the cup holder (the materials of which food and drink holder 610 are manufactured are flexible/resilient/pliable). When inserting drink receptacle 612 into a cup holder, the major axis L reduces and the minor axis W increases. The tray cup holder 12 will dynamically adapt to the size of the cup holder in which it is received. It also widens the minor axis allowing cup removal from the drink receptacle 612 with minimum resistance, which helps prevent the tray from being pulled out of the cup holder when a user removes a cup from the drink receptacle in order to take a drink therefrom. Indentations 616 in sidewall 615 of drink receptacle 612 as well as apertures 618 allow the drink receptacle to secure various sized cups therein. It should also be appreciated that the continuous rib around food receptacle 614 and connecting portion 632 can be used to secure a lid to attach to and cover food in receptacle 614. The portion of continuous rib 633 going across connecting portion 632 also increases the strength and reduces flex between cup receptacle 612 and food receptacle 614. As is with some of the previous embodiments, the upwards slope of the food receptacle 612 offsets venue cup holders mounted with a downward slope.

Figure 33:
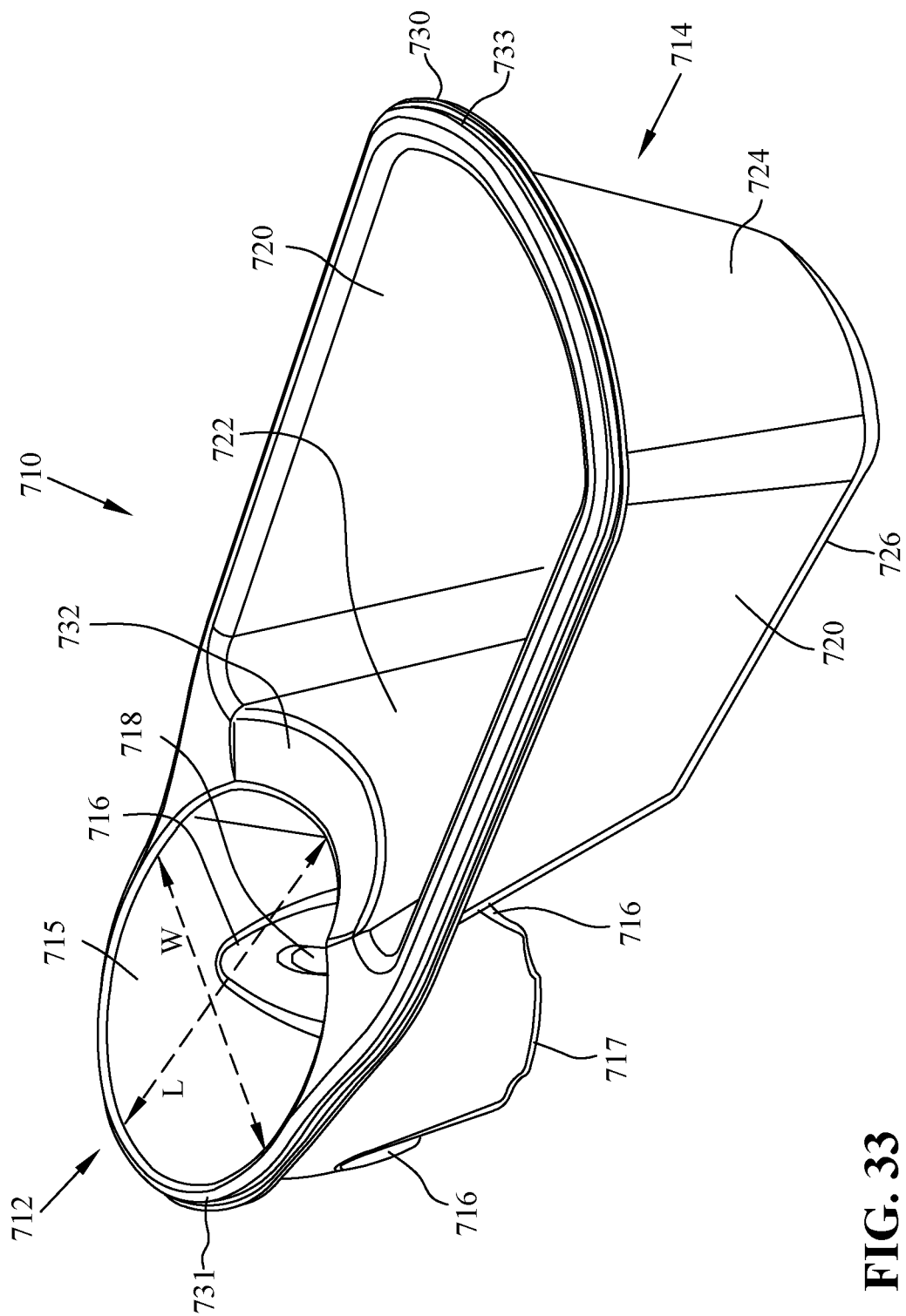
FIG. 33 is yet another embodiment of a food and drink holder in accordance with the subject invention also including an oval drink holder and an inverted arched bridge connecting portion connecting the drink holder and the food holder.
Figure 34:
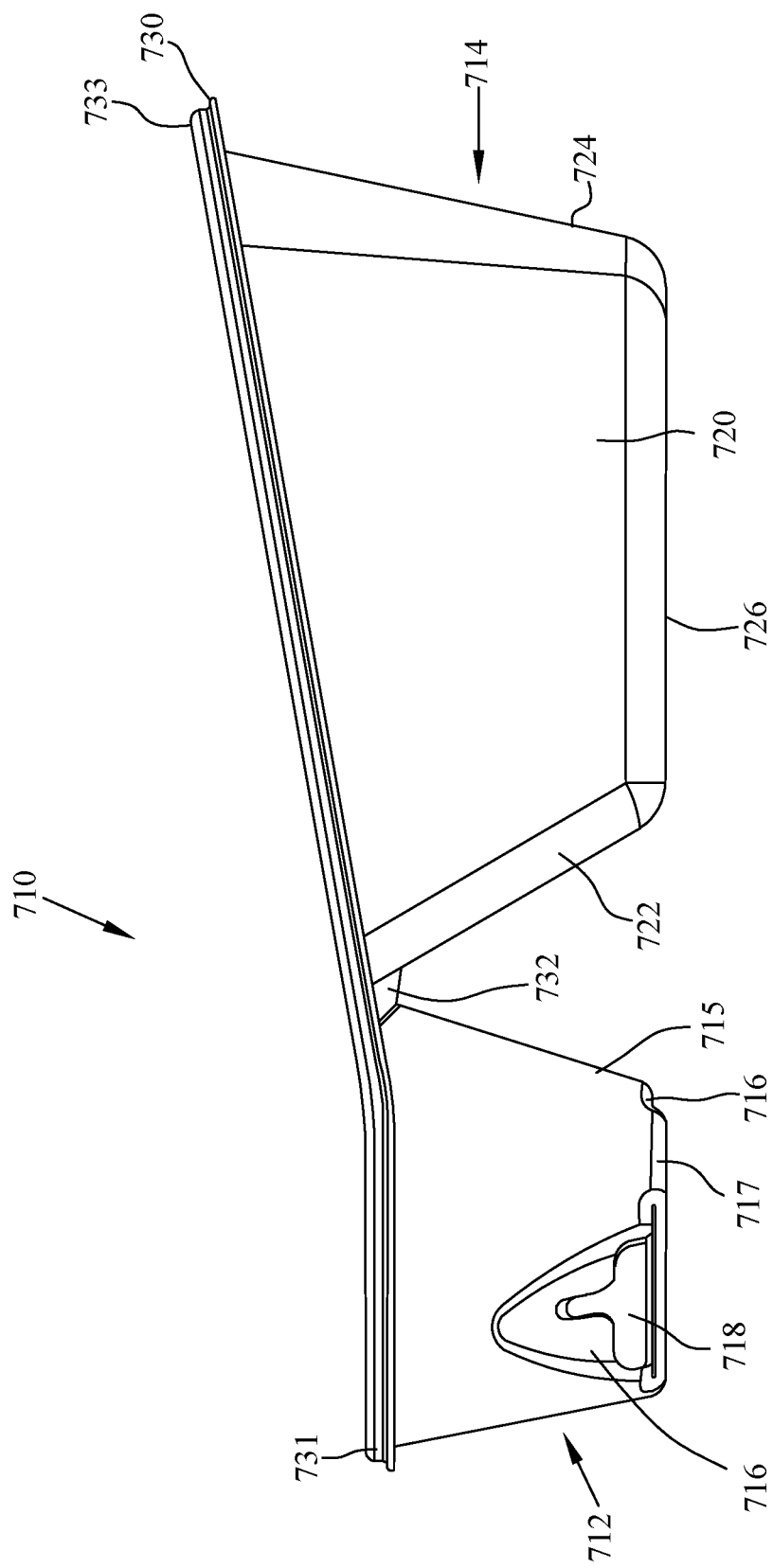
FIG. 34 is a side view of the food and drink holder of FIG. 33.

Now referring to FIGS. 33 and 34, another alternate embodiment food and drink holder is generally indicated as 710. Food and drink holder 710 has a drink receptacle, generally indicated as 712, and a food receptacle, generally indicated as 714. Drink receptacle 712 has a sidewall 715 having a generally oval shape. Sidewall 715 is connected to a bottom wall 717 and a plurality of indentations 716 are located in sidewall 715 and extending to bottom wall 717.

An aperture or cutouts 718 is located in each indentation and the apertures 718 have a generally inverted T-shaped configuration in the embodiment shown.

Food receptacle 714 includes a pair of sidewalls 720, a front wall 722, and an end wall 724. A bottom wall 626 extends between the sidewalls, front wall and end wall to form a bottom to hold food in receptacle 714. A flange 730 extends around the outside top edge of food receptacle 714 as well as drink receptacle 712. A downwardly extending lip 731 is located around drink receptacle 712, and a downward extending arch 733 is located in flange 730. Food and drink holder 710 also includes a connecting portion 732 which connects drink receptacle 712 to food receptacle 714. In this embodiment, the connecting portion 732 has an inverted arch shape configuration and is wider than the connecting portion in some of the other embodiments.

Similar to food and drink holder 610, the drink receptacle 712 of food and drink holder 710 has a longitudinal main axis L that is longer than a minor axis W coinciding with width of the drink holder. As with food and drink holder 610, the oval shape of food and drink holder 710 provides similar benefits as described above for food and drink holder 610. Lip 731 and arch 733 in flange 730 provide a thin continuous side rib that increases the strength of the food and drink holder while providing clearance for insertion of the drink receptacle 712 into cup holders of a venue. The inverted arch connecting portion 732 across the bridge increases the strength and reduces flex between the cup holder and food area. The middle or center portion of the arch extends closer to the bottom walls of the food and drink receptacles than outer areas or portions of the arch.

It should be appreciated that the oval shape of drink receptacle wall 715 is designed to flex towards the cup holder center creating a small draft angle when inserted into cup holders of a venue, which reduces or eliminates tipping. The same feature also helps create a snug fit when inserted into cup holders of a venue regardless of the size of the cup holder. Another advantage of wider bridge 732 is that it allows users with large hands to securely hold the tray either in their seat or when carrying without tipping. The upward draft angle of food and drink holder 710, moves the tray flex point from the front of the bridge to the middle of the bridge where the bridge is strongest.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. As such, the scope of the invention is indicated by the following claims rather than by the description.

The invention claimed is:

1. A food and drink holder configured to be removably mounted to a cup holder attached to seats or an arm rest comprising:
a drink receptacle, the drink receptacle including a resilient generally oval-shaped sidewall having a major axis extending in a long direction of the oval-shaped sidewall, a minor axis extending across a width of the oval-shaped sidewall, and a central axis extending generally perpendicular to the major and minor axes, the sidewall configured to be removably mounted in an opening in the cup holder; and
a food receptacle having a pair of sidewalls, a front wall, an end wall, a bottom wall, and a top end, the top end of the food receptacle extending upwardly at an angle less than 90° to the central axis of the sidewall of the drink receptacle.

2. The food and drink holder as set forth in claim 1, wherein when the drink receptacle is inserted in a cup holder, the major axis reduces and the minor axis increases.

3. The food and drink holder as set forth in claim 2, including a plurality of inwardly extending indentations in the sidewall of the drink receptacle.

4. The food and drink holder as set forth in claim 3, wherein the drink receptacle has a bottom wall and apertures in at least one of the sidewall or bottom wall of the drink receptacle.

5. The food and drink holder as set forth in claim 4, wherein the apertures have an inverted T-shaped configuration.

6. The food and drink holder as set forth in claim 4, including three indentations in the sidewall of the drink receptacle spaced at approximately 120° apart and one of the indentations is located in the rearmost end of the sidewall towards the food receptacle.

7. The food and drink holder as set forth in claim 1, further including a flange extending at least partially around an upper end of the food and drink holder.

8. The food and drink holder as set forth in claim 7, wherein the flange extends completely around the food and drink holder and the flange around the food receptacle is at an angle to the flange around the drink receptacle.

9. The food and drink holder as set forth in claim 7, wherein the flange extends around the sidewalls and end wall of the food receptacle and transitions to flare up on at least a portion of the drink receptacle.

10. A food and drink holder configured to be removably mounted to a cup holder attached to seats or an arm rest comprising:
a drink receptacle, the drink receptacle including a resilient sidewall configured to be removably mounted in an opening in the cup holder;
a food receptacle having a pair of sidewalls, a front wall, an end wall, a bottom wall, and a top end; and
an arched connecting portion connecting the drink receptacle and the food receptacle.

11. The food and drink holder as set forth in claim 10, wherein the arched connecting portion is inverted so that a middle of the connecting portion is closer to a bottom wall of the food receptacle than outer portions of the connecting portion.

12. The food and drink holder as set forth in claim 11, wherein said arched connecting portion is configured to supported by a user's hands.

13. The food and drink holder as set forth in claim 12, wherein the sidewall of the drink receptacle has a generally oval-shaped configuration including a longitudinal major axis and a minor axis extending across a width of the drink receptacle.

14. The food and drink holder as set forth in claim 13, wherein the sidewall of the drink receptacle has a central axis, and the top end of the food receptacle extends at an angle, less than 90°, to the central axis of the sidewall of the drink receptacle.

15. The food and drink holder as set forth in claim 13, wherein when the drink receptacle is inserted in a cup holder, the major axis reduces and the minor axis increases.

16. The food and drink holder as set forth in claim 15, including a flange around at least the upper end of the food receptacle and a continuous rib extending around the food receptacle located at least partially on the flange, the continuous rib configured to receive and attach a lid for the food receptacle.

17. A food and drink holder configured to be removably mounted to a cup holder attached to seats or an arm rest comprising:
    a drink receptacle, the drink receptacle including a resilient generally oval-shaped sidewall, the sidewall configured to be removably mounted in an opening of the cup holder;
    a food receptacle having a pair of sidewalls, a front wall, an end wall, a bottom wall, and a top end; and
    a flange extending around the sidewalls and end wall at the top end of the food receptacle and transitioning to flare up at an angle along at least a portion of the sidewall of the drink receptacle.

18. The food and drink holder as set forth in claim 17, including indentations in the sidewall of the drink receptacle and apertures in the indentations.

19. The food and drink holder as set forth in claim 18, wherein there are three indentations in the drink receptacle spaced at approximately 120° degrees from one another around the sidewall of the drink receptacle.

20. The food and drink holder as set forth in claim 19, wherein the generally oval-shaped sidewall of the drink receptacle has a longitudinal major axis along the length of the drink receptacle and a minor axis extending across a width of the drink receptacle and when the drink receptacle is inserted in a cup holder, the major axis reduces and the minor axis increases.

* * * * *